(12) United States Patent
Feng et al.

(10) Patent No.: US 12,149,697 B2
(45) Date of Patent: Nov. 19, 2024

(54) ENCODING METHOD AND ENCODER

(71) Applicant: HUAWEI TECHNOLOGIES CO., LTD., Guangdong (CN)

(72) Inventors: Junkai Feng, Xi'an (CN); Bo Qu, Xi'an (CN); Liping Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 322 days.

(21) Appl. No.: 17/853,714

(22) Filed: Jun. 29, 2022

(65) Prior Publication Data
US 2022/0329818 A1 Oct. 13, 2022

Related U.S. Application Data

(63) Continuation of application No. PCT/CN2020/139681, filed on Dec. 25, 2020.

(30) Foreign Application Priority Data

Dec. 31, 2019 (CN) .......................... 201911409778.7

(51) Int. Cl.
*H04N 19/132* (2014.01)
*H04N 19/103* (2014.01)
(Continued)

(52) U.S. Cl.
CPC ......... *H04N 19/132* (2014.11); *H04N 19/103* (2014.11); *H04N 19/146* (2014.11); *H04N 19/176* (2014.11)

(58) Field of Classification Search
CPC .. H04N 19/132; H04N 19/103; H04N 19/146; H04N 19/176
(Continued)

(56) References Cited

U.S. PATENT DOCUMENTS 7,925,101 B2  4/2011 Niu
8,208,545 B2  6/2012 Seo et al.
(Continued)

FOREIGN PATENT DOCUMENTS

| CN | 1953551 A | 4/2007 |
| CN | 101159870 A | 4/2008 |

(Continued)

OTHER PUBLICATIONS

He et al., "Low-Power VLSI Design for Motion Estimation Using Adaptive Pixel Truncation," IEEE Transactions on Circuits and Systems for Video Technology, vol. 10, No. 5, Aug. 2000, 10 pages.
(Continued)

*Primary Examiner* — Allen C Wong
(74) *Attorney, Agent, or Firm* — Fish & Richardson P.C.

(57) ABSTRACT

This application provides example encoding methods and example encoders. One example method includes performing bit truncation on a to-be-encoded block when a bit rate control condition is satisfied. A first cost value corresponding to the bit truncation can then be calculated. The to-be-encoded block can then be predicted to determine a prediction residual of the to-be-encoded block when the bit rate control condition is satisfied. A second cost value corresponding to the prediction can then be calculated based on the prediction residual. The first cost value can then be compared with the second cost value to determine an encoded bit.

20 Claims, 12 Drawing Sheets

(51) Int. Cl.
*H04N 19/146* (2014.01)
*H04N 19/176* (2014.01)

(58) Field of Classification Search
USPC .................................................. 375/240.02
See application file for complete search history.

(56) References Cited

U.S. PATENT DOCUMENTS

| | | |
|---|---|---|
| 2008/0043841 A1 | 2/2008 | Su et al. |
| 2010/0098173 A1 | 4/2010 | Horiuchi et al. |
| 2015/0264402 A1 | 9/2015 | Zhang et al. |
| 2017/0201753 A1* | 7/2017 | Thirumalai .......... H04N 19/117 |
| 2018/0167635 A1 | 6/2018 | Wang et al. |
| 2018/0288420 A1* | 10/2018 | Yu ........................ H04N 19/172 |
| 2020/0014956 A1* | 1/2020 | Rosewarne .......... H04N 19/146 |

FOREIGN PATENT DOCUMENTS

| | | |
|---|---|---|
| CN | 101193304 A | 6/2008 |
| CN | 101202912 A | 6/2008 |
| CN | 103248891 A | 8/2013 |
| CN | 103686187 A | 3/2014 |
| CN | 105208390 A | 12/2015 |

OTHER PUBLICATIONS

Office Action in Chinese Appln. No. 201911409778.7, dated Nov. 10, 2021, 10 pages (with English translation).

International Search Report and Written Opinion in International Appln. No. PCT/CN2020/139681, mailed on Mar. 24, 2021, 14 pages (with English translation).

Partial European Search Report in European Appln No. 20910708.5, dated Jan. 2, 2023, 11 pages.

* cited by examiner

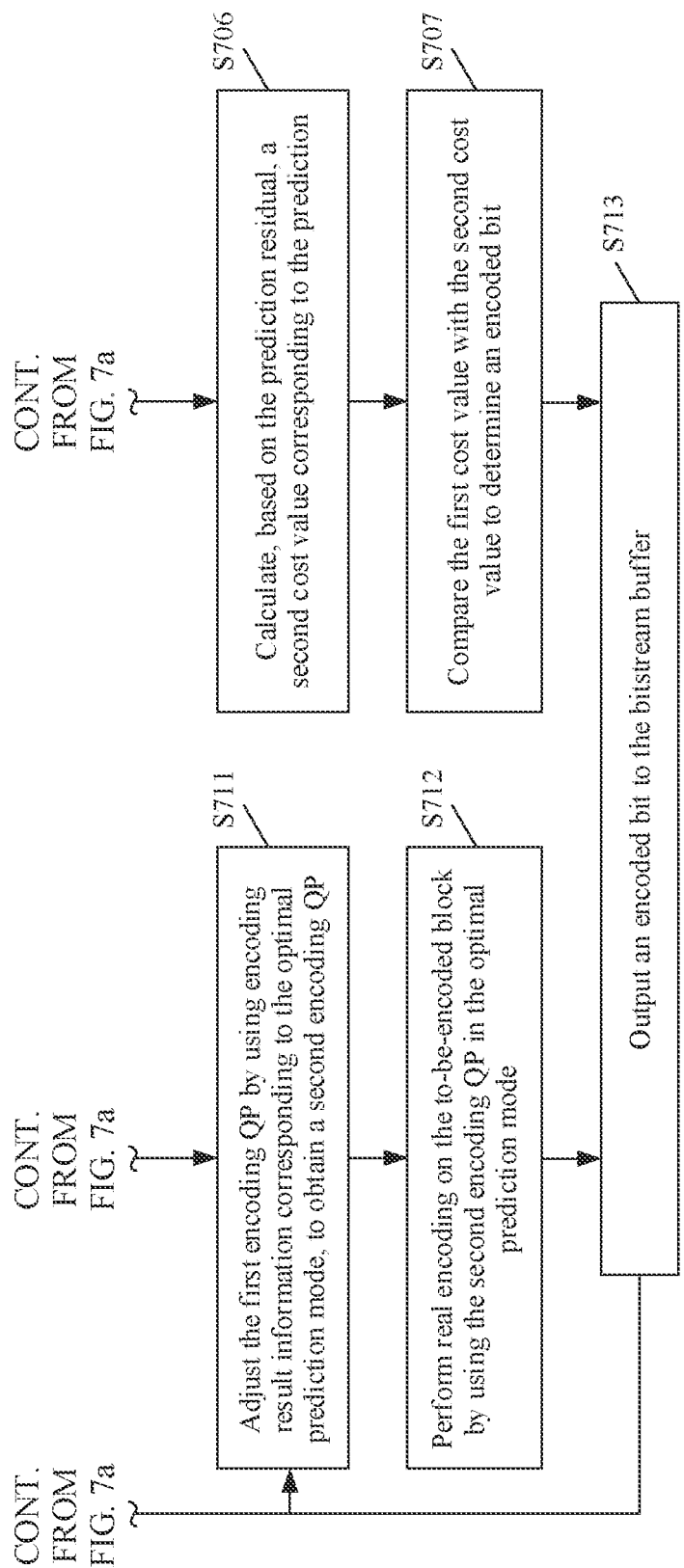

ENCODING METHOD AND ENCODER

CROSS-REFERENCE TO RELATED APPLICATIONS

This application is a continuation of International Application No. PCT/CN2020/139681, filed on Dec. 25, 2020, which claims priority to Chinese Patent Application No. 201911409778.7, filed on Dec. 31, 2019. The disclosures of the aforementioned applications are hereby incorporated by reference in their entireties.

TECHNICAL FIELD

This application relates to the image processing field, and in particular, to an encoding method and an encoder.

BACKGROUND

Video image applications have been improved in multiple dimensions (such as resolution and frame rate) these years, which results in a significant rise in an amount of data processed by a video processing system. A bandwidth, power consumption, and costs of the video processing system are greatly increased. A compression technology is applied to effectively reduce the bandwidth, the power consumption, and the costs of the video processing system.

The compression technology can effectively reduce memory and bandwidth usages of the video processing system, and cut the costs of the video processing system. Compared with lossless compression, lossy compression without affecting image quality usually has a higher compression rate, and can reduce the memory and bandwidth usages. As an important part of lossy compression, bit rate control needs to ensure that an encoding bit rate meets limitations on the system memory and the bandwidth. When the encoding bit rate is about to reach an upper limit of the system, the bit rate is usually forcibly compressed in a conventional technology, so that the encoding bit rate meets the limitations on the system memory and the bandwidth. In this case, a decoded image is usually distorted greatly. Therefore, there is still room for optimization in existing forcible bit rate control measures.

SUMMARY

Embodiments of this application provide an encoding method and an encoder, to improve image decoding quality while ensuring that an encoding bit rate meets limitations on system memory and bandwidth.

According to a first aspect, an embodiment of this application provides an encoding method, including: performing bit truncation on a to-be-encoded block when a forcible bit rate control condition is satisfied; calculating a first cost value corresponding to the bit truncation; further predicting the to-be-encoded block to determine a prediction residual of the to-be-encoded block when the forcible bit rate control condition is satisfied; calculating, based on the prediction residual, a second cost value corresponding to the prediction; and comparing the first cost value with the second cost value to determine an encoded bit.

In a possible implementation, the encoded bit carries an encoding mode of the encoded bit, and the encoding mode is bit truncation or prediction.

Specifically, the bit truncation may be performed on a pixel value of a current coding pixel in the to-be-encoded block, or may be performed on the prediction residual after the to-be-encoded block is predicted. In this application, a bit truncation mode is referred to as a forcible bit rate control mode of a spatial-domain branch. The prediction of the spatial-domain branch may be point-level prediction or block-level prediction.

In block-level prediction, a coding block is used as a prediction unit, and a pixel in a current coding block cannot be used as a reference pixel for a subsequent pixel in the current coding block. In point-level prediction, a point is used as a prediction unit, and a pixel in a current coding block may be used as a reference pixel for a subsequent pixel in the current coding block.

In a possible implementation, a bit truncation mode of a pixel value of a current coding pixel in the to-be-encoded block may be referred to as a forcible bit rate control mode 1 of the spatial-domain branch, a bit truncation mode of a prediction residual of a to-be-encoded pixel is referred to as a forcible bit rate control mode 2 of the spatial-domain branch. When forcible bit rate control of the spatial-domain branch is performed, encoding costs of the foregoing mode 1 and mode 2 may be compared, and a mode with a lower encoding cost is selected as the forcible bit rate control mode of the spatial-domain branch.

Specifically, when the forcible bit rate control condition is satisfied, the to-be-encoded block is further predicted, which may be considered as a forcible bit rate control mode of a frequency domain branch. The prediction of the frequency domain branch may be block-level prediction.

Specifically, after the encoded bit is determined, an encoding mode of the encoded bit may be further signaled in the encoded bitstream, so that the decoder side decodes based on the encoding mode of the encoded bit.

Possibly, a method for calculating a cost value may include any one of the following: an encoding bit rate (rate, R), a rate-distortion cost (rate-distortion cost, RDCOST), an encoding distortion magnitude, or the like.

The encoding distortion magnitude may be measured by using a measure such as a sum of absolute difference (sum of absolute difference, SAD), a mean absolute difference (mean absolute difference, MAD), a sum of squared difference (sum of squared difference, SSD), a sum of squared error (sum of squared error, SSE), and a mean squared error (mean squared error, MSE).

In this embodiment of this application, when a system needs to forcibly control a bit rate, the system predicts potential encoding costs caused after the bit rate is controlled by using two different modes of a spatial-domain branch and a frequency domain branch, selects a mode with a lower encoding cost to control the bit rate, and finally outputs the encoded bit. This can allow the limited output encoded bit to carry useful information (that is, information that can be easily perceived by human eyes) as much as possible, and improve image decoding quality while ensuring that the encoding bit rate meets the limitations on system memory and the bandwidth.

In a possible implementation, before the performing bit truncation on a to-be-encoded block when a forcible bit rate control condition is satisfied, the foregoing method further includes: determining whether the forcible bit rate control condition is satisfied; determining a first encoding quantization parameter QP if the forcible bit rate control condition is not satisfied; separately precoding the to-be-encoded block by using the first encoding QP in a plurality of prediction modes, to obtain precoding result information corresponding to each prediction mode; selecting an optimal prediction mode from the plurality of prediction modes; adjusting the first encoding QP by using encoding result information corresponding to the optimal prediction mode, to obtain a second encoding QP; and performing real encoding on the to-be-encoded block by using the second encoding QP in the optimal prediction mode.

Possibly, the precoding result information includes at least one of the following: a quantity of encoded bits of the to-be-encoded block in the first encoding QP, an encoding distortion magnitude of the to-be-encoded block in the first encoding QP, an encoding rate distortion cost of the to-be-encoded block in the first encoding QP, the prediction residual of the to-be-encoded block, and texture complexity of the to-be-encoded block.

In this embodiment of this application, when the system does not need to forcibly control the bit rate, the to-be-encoded block is precoded in a plurality of prediction modes, to determine an optimal prediction mode. Then the system adjusts the first encoding QP by using precoding result information corresponding to the optimal prediction mode, and performs real encoding on the to-be-encoded block by using an adjusted encoding QP in the optimal prediction mode. This can properly use the bit rate to transfer image data with better quality, to improve image compression performance.

In a possible implementation, after the encoded bit is determined, the method further includes: outputting the encoded bit to a bitstream buffer. The determining whether the forcible bit rate control condition is satisfied includes: determining whether the forcible bit rate control condition is satisfied based on a fullness status of the bitstream buffer. The adjusting the first encoding QP by using encoding result information corresponding to the optimal prediction mode includes: adjusting the first encoding QP based on the fullness status of the bitstream buffer and the encoding result information corresponding to the optimal prediction mode.

In this embodiment of this application, whether the forcible bit rate control is needed may be determined based on the fullness status of the bitstream buffer. When the bitstream buffer is about to overflow, the forcible bit rate control can reduce an output bit rate of the to-be-encoded block, to prevent bitstream buffer overflow and ensure that an actual encoding bit rate is less than a target bit rate. In addition, when the forcible bit rate control is not needed, the fullness status of the bitstream buffer can be used to adjust an encoding QP. If the bitstream buffer is full, a QP value may be increased to prevent bitstream buffer overflow. If the bitstream buffer is empty, the QP value may be decreased, so that an encoded image carries more image information while ensuring image compression quality.

In a possible implementation, the comparing the first cost value with the second cost value to determine an encoded bit specifically includes: if the first cost value is less than the second cost value, determining that the encoded bit is an encoded bit obtained after bit truncation.

When the first cost value is less than the second cost value, it indicates that bit rate control in the bit truncation mode of the spatial-domain branch causes less image quality loss. In this case, the bit truncation mode of the spatial-domain branch is preferentially selected to control the bit rate, and an output encoded bit is an encoded bit obtained after the bit truncation.

In a possible implementation, the comparing the first cost value with the second cost value to determine an encoded bit specifically includes: if the first cost value is greater than the second cost value, determining that the encoded bit is an encoded bit obtained after entropy encoding is performed on the prediction residual.

When the second cost value is less than the first cost value, it indicates that bit rate control in the block-level prediction mode of the frequency domain branch causes less image quality loss. In this case, the block-level prediction mode of the frequency domain branch is preferentially selected to control the bit rate, and an output encoded bit is an encoded bit obtained after entropy encoding is performed on residual information output by the block-level prediction of the frequency domain branch. After the block-level prediction on the to-be-encoded block, the direct entropy encoding mode of the residual information of the to-be-encoded block may be considered as: Frequency domain transformation is performed on the prediction residual to obtain N frequency domain transform coefficients of the prediction residual, and then all the N frequency domain transform coefficients are set to zero, that is, all the transform coefficients are discarded. In this embodiment of this application, this mode is referred to as discarding all the transform coefficients of the frequency domain branch.

This is not limited to discarding all transform coefficients. In the frequency domain branch, some transform coefficients may be discarded for the forcible bit rate control. In the following, discarding all transform coefficients and discarding some transform coefficients are collectively referred to as coefficient discarding of a frequency domain branch.

In another possible implementation, the calculating, based on the prediction residual, a second cost value corresponding to the prediction includes: performing frequency domain transformation on the prediction residual to obtain N frequency domain transform coefficients of the prediction residual, where N is a positive integer; setting M frequency domain transform coefficients in the N frequency domain transform coefficients to zero to obtain N zeroed frequency domain transform coefficients, where M is a positive integer less than N; calculating a corresponding second cost value for setting the M frequency domain transform coefficients to zero. The comparing the first cost value with the second cost value to determine an encoded bit specifically includes: if the first cost value is greater than the second cost value, determining that the encoded bit is an encoded bit obtained after entropy encoding is performed on the N zeroed frequency domain transform coefficients. The mode in which the M frequency domain transform coefficients in the N frequency domain transform coefficients are set to zero may be considered as discarding some transform coefficients of the frequency domain branch.

Specifically, a method for calculating the second cost value may be an encoding bit rate, an RDCOST, an encoding distortion magnitude, or the like. The encoding distortion magnitude may be measured by using a measure such as an SAD, an MAD, an SSD, an SSE, and an MSE. The encoding distortion magnitude may be specifically a difference between residual information before transformation and residual information after inverse transformation.

When the first cost value is equal to the second cost value, the bit truncation mode or the transform coefficient discarding mode may be randomly selected to control the bit rate. An output encoded bit is an encoded bit obtained after the bit truncation or an encoded bit obtained after the entropy encoding is performed on residual information output by prediction. In this embodiment of this application, a forcible bit rate control mode selected when cost values are equal is not limited.

In this embodiment of this application, coefficient discarding of the frequency domain branch is performed only on the frequency domain transform coefficients of the residual information. Even if a large quantity of transform coefficients are discarded, prediction information of the to-be-encoded block can still retain some texture information of the image. Discarding some transform coefficients (that is, setting the transform coefficients to zero) can reduce the bit rate and ensure the image decoding quality.

In another possible implementation, after the performing frequency domain transformation on the prediction residual to obtain N frequency domain transform coefficients of the prediction residual, and before the setting M frequency domain transform coefficients in the N frequency domain transform coefficients to zero, the foregoing method further includes: quantizing the N frequency domain transform coefficients to obtain N quantized frequency domain transform coefficients. The setting M frequency domain transform coefficients in the N frequency domain transform coefficients to zero includes: setting M frequency domain transform coefficients in the N quantized frequency domain transform coefficients to zero.

In another possible implementation, after the setting M frequency domain transform coefficients in the N frequency domain transform coefficients to zero, and before the calculating a corresponding second cost value for setting the M frequency domain transform coefficients to zero, the foregoing method further includes: quantizing the N zeroed frequency domain transform coefficients. The calculating a corresponding second cost value for setting the M frequency domain transform coefficients to zero includes: calculating a second cost value for quantizing the N zeroed frequency domain transform coefficients. In this embodiment of this application, transform coefficients are quantized after being set to zero, so that transform coefficients that need to be quantized can be reduced.

Compared with a mode in which transform coefficients are quantized after being set to zero (discarded), a mode in which quantized transform coefficients are set to zero (discarded) can retain more frequency components (a quantity of quantized coefficients that are set to zero before the coefficients are set to zero may be less than or equal to a quantity of quantized coefficients that are set to zero after the coefficients are set to zero). This helps improve quality of image of specific content.

In another possible implementation, a mode in which transform coefficients are quantized and then partially discarded may be referred to as a forcible bit rate control mode 1 of the frequency domain branch, and a mode in which some coefficients are discarded and then quantized is referred to as a forcible bit rate control mode 2 of the frequency domain branch. When forcible bit rate control of the frequency domain branch is performed, encoding costs of the foregoing mode 1 and mode 2 may be compared, and a mode with a lower encoding cost is selected as the forcible bit rate control mode of the frequency domain branch.

In another possible implementation mode, before the further predicting the to-be-encoded block to determine a prediction residual of the to-be-encoded block when the forcible bit rate control condition is satisfied, the foregoing method further includes: selecting a target prediction mode from the plurality of prediction modes according to a preset cost calculation rule, where the target prediction mode is a prediction mode with a lowest cost value in the plurality of prediction modes, and different prediction modes correspond to different prediction directions and/or different prediction value calculation methods. The further predicting the to-be-encoded block to determine a prediction residual of the to-be-encoded block when the forcible bit rate control condition is satisfied includes: further performing the block-level prediction on the to-be-encoded block in the target prediction mode to determine the prediction residual of the to-be-encoded block when the forcible bit rate control condition is satisfied.

In this embodiment of this application, a plurality of prediction modes may be further analyzed, and a prediction mode with a lowest encoding cost is selected to perform the block-level prediction on the to-be-encoded block, to reduce encoding distortion and ensure image encoding quality.

According to a second aspect, an embodiment of this application provides an encoder, including: a bit truncation module, configured to perform bit truncation on a to-be-encoded block when a forcible bit rate control condition is satisfied; a first cost calculation module, configured to calculate a first cost value corresponding to the bit truncation; a prediction module, configured to predict the to-be-encoded block to determine a prediction residual of the to-be-encoded block when the forcible bit rate control condition is satisfied; a second cost calculation module, configured to calculate a second cost value corresponding to the prediction based on the prediction residual; and a comparison determining module, configured to compare the first cost value with the second cost value to determine an encoded bit.

In a possible implementation, the encoded bit carries an encoding mode of the encoded bit, and the encoding mode is bit truncation or prediction.

Possibly, after the encoded bit is determined, an encoding mode of the encoded bit may be further signaled in the encoded bitstream, so that the decoder side decodes based on the encoding mode of the encoded bit.

Possibly, a method for calculating a cost value may include any one of the following: an encoding bit rate, an RDCOST, an encoding distortion magnitude, or the like. The encoding distortion magnitude may be measured by using a measure such as an SAD, an MAD, an SSD, an SSE, and an MSE.

In a possible implementation, the encoder further includes: a determining module, configured to determine whether the forcible bit rate control condition is satisfied; a first bit rate control module, configured to determine a first encoding quantization parameter QP if the forcible bit rate control condition is not satisfied; a precoding module, configured to separately precode the to-be-encoded block by using the first encoding QP in a plurality of prediction modes, to obtain precoding result information corresponding to each prediction mode; a selecting module, configured to select an optimal prediction mode from the plurality of prediction modes; a second bit rate control module, configured to adjust the first encoding QP by using encoding result information corresponding to the optimal prediction mode, to obtain a second encoding QP; and a real encoding module, configured to perform real encoding on the to-be-encoded block by using the second encoding QP in the optimal prediction mode.

In a possible implementation, the encoder further includes: an output module, configured to output the encoded bit to a bitstream buffer; the determining module, specifically configured to: determine whether the forcible bit rate control condition is satisfied based on a fullness status of the bitstream buffer; and the second bit rate control module, specifically configured to: adjust the first encoding QP based on the fullness status of the bitstream buffer and the encoding result information corresponding to the optimal prediction mode.

In a possible implementation, the comparison determining module is specifically configured to: if the first cost value is less than the second cost value, determine that the encoded bit is an encoded bit obtained after the bit truncation.

In another possible implementation, the comparison determining module is specifically configured to: if the first cost value is greater than the second cost value, determine that the encoded bit is an encoded bit obtained after entropy encoding is performed on the prediction residual.

In another possible implementation, the second cost calculation module includes: a transform unit, configured to perform frequency domain transformation on the prediction residual to obtain N frequency domain transform coefficients of the prediction residual, where N is a positive integer; an unsetting unit, configured to set M frequency domain transform coefficients in the N frequency domain transform coefficients to zero to obtain N zeroed frequency domain transform coefficients, where M is a positive integer less than N; a cost calculation unit, configured to calculate a corresponding second cost value for setting the M frequency domain transform coefficients to zero; and the comparison determining module, specifically configured to: if the first cost value is greater than the second cost value, determine that the encoded bit is an encoded bit obtained after entropy encoding is performed on the N zeroed frequency domain transform coefficients.

Specifically, a method for calculating the second cost value may be an encoding distortion magnitude, specifically a difference between residual information before transformation and residual information after inverse transformation.

In another possible implementation, the second cost calculation module further includes: a quantization unit, configured to: quantize the N frequency domain transform coefficients to obtain N frequency domain transform coefficients, after the transform unit performs frequency domain transformation on the prediction residual to obtain N frequency domain transform coefficients of the prediction residual, and before the unsetting unit sets M frequency domain transform coefficients in the N frequency domain transform coefficients to zero; and the unsetting unit, specifically configured to: set M frequency domain transform coefficients in the N quantized frequency domain transform coefficients to zero.

In another possible implementation, the second cost calculation module further includes: a quantization unit, configured to: quantize the N zeroed frequency domain transform coefficients, after the unsetting unit sets M frequency domain transform coefficients in the N frequency domain transform coefficients to zero, and before the cost calculation unit calculates a corresponding second cost value for setting the M frequency domain transform coefficients to zero; and the cost calculation unit, specifically configured to: calculate a second cost value for quantizing the N zeroed frequency domain transform coefficients.

In another possible implementation, the encoder further includes: a pre-analysis module, configured to select a target prediction mode from the plurality of prediction modes according to a preset cost calculation rule, where the target prediction mode is a prediction mode with a lowest cost value in the plurality of prediction modes, and different prediction modes correspond to different prediction directions and/or different prediction value calculation methods; and the prediction module is specifically configured to predict the to-be-encoded block in the target prediction mode to determine the prediction residual of the to-be-encoded block when the forcible bit rate control condition is satisfied.

According to a third aspect, an embodiment of this application provides an encoder, including a processor and a transmission interface. The processor is configured to invoke software instructions stored in a memory, to perform the encoding method provided in the first aspect or any possible implementation of the first aspect of the embodiments of this application.

In a possible implementation, the encoder further includes the memory.

According to a fourth aspect, an embodiment of this application provides a computer-readable storage medium, where the computer-readable storage medium stores instructions, and when the instructions are run on a computer or a processor, the computer or the processor is enabled to perform the encoding method provided in the first aspect or any possible implementation of the first aspect of the embodiments of this application.

According to a fifth aspect, an embodiment of this application provides a computer program product including instructions. When the computer program product runs on a computer or a processor, the computer or the processor is enabled to perform the encoding method provided in the first aspect or any possible implementation of the first aspect of the embodiments of this application.

It may be understood that the encoder provided in the second aspect, the encoder provided in the third aspect, the computer storage medium provided in the fourth aspect, and the computer program product provided in the fifth aspect are all configured to perform the encoding method provided in the first aspect. Therefore, for beneficial effects that can be achieved, refer to beneficial effects in the encoding method provided in the first aspect, and details are not described herein again.

BRIEF DESCRIPTION OF DRAWINGS

To describe technical solutions of embodiments of this application more clearly, the following briefly describes the accompanying drawings for describing embodiments.

FIG. 7a and FIG. 7b are a schematic flowchart of another encoding method according to an embodiment of this application:

DESCRIPTION OF EMBODIMENTS

Figure 1:
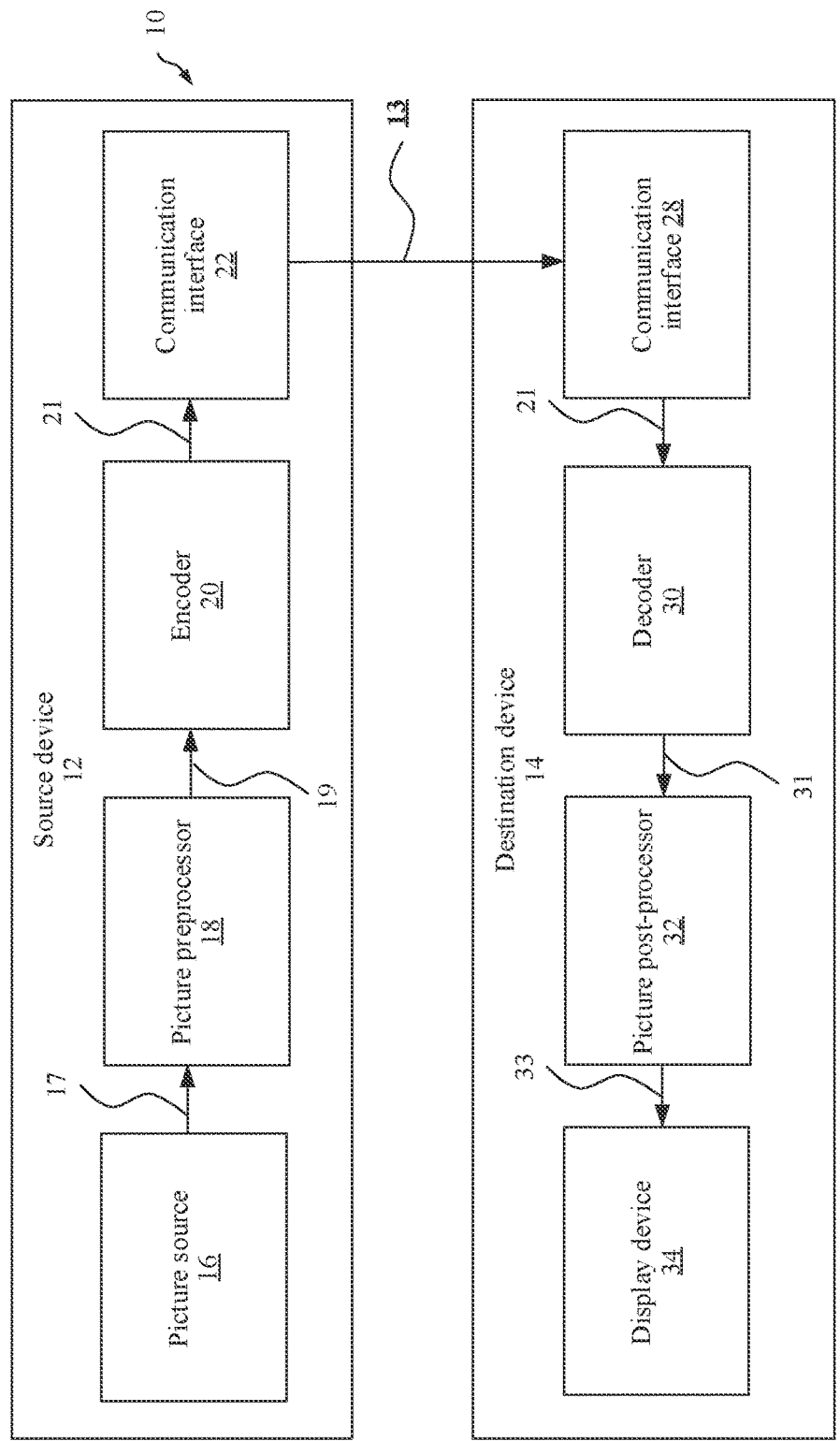
FIG. 1 is a block diagram of a video encoding and decoding system to which this application is applicable.

The following clearly and completely describes the technical solutions in embodiments of this application with reference to the accompanying drawings in embodiments of this application.

The technical solutions in embodiments of this application are not only applicable to existing video coding standards (for example, standards such as H.264 and HEVC), but also applicable to a future video coding standard (for example, the H.266 standard). Terms used in embodiments of this application are only used for explaining specific embodiments of this application, but are not intended to limit this application. The following first briefly describes related concepts in embodiments of this application.

Video coding usually refers to processing of a sequence of pictures, where the sequence of pictures forms a video or a video sequence. In the field of video coding, the terms "picture (picture)", "frame (frame)", or "image (image)" may be used as synonyms. Video encoding is performed on a source side, and usually includes processing (for example, by compression) original video pictures to reduce an amount of data for representing the video pictures for more efficient storage and/or transmission. Video decoding is performed on a destination side, and usually includes inverse processing relative to an encoder, to reconstruct video pictures.

A video sequence includes a series of images (picture), an image is further split into slices (slice), and a slice is further split into blocks (block). In video coding, coding processing is performed per block. In some new video coding standards, a concept "block" is further extended. For example, in the H.264 standard, there is a macroblock (macroblock, MB), and the macroblock may be further split into a plurality of prediction blocks (partition) that can be used for predictive coding. In the high efficiency video coding (high efficiency video coding, HEVC) standard, basic concepts such as a coding unit (coding unit, CU), a prediction unit (prediction unit, PU), and a transform unit (transform unit, TU) are used.

In this specification, for ease of description and understanding, a coding block to be processed in an image may be referred to as a current coding block or a to-be-processed coding block. For example, in encoding, the coding block is a block that is being encoded, and in decoding, the coding block is a block that is being decoded. A decoded coding block that is in a reference image and that is for predicting the current block is referred to as a reference block. In other words, the reference block is a block that provides a reference signal for the current block, where the reference signal indicates a pixel value in the coding block. A block that provides a prediction signal for a current block in a reference image may be referred to as a prediction block. The prediction signal indicates a pixel value, a sampling value, or a sampling signal in the prediction block. For example, an optimal reference block is found after a plurality of reference blocks are traversed, the optimal reference block provides prediction for the current block, and this block is referred to as a prediction block.

In a case of lossless video coding, original video pictures can be reconstructed. In other words, reconstructed video pictures have the same quality as the original video pictures (assuming that no transmission loss or other data loss occurs during storage or transmission). In a case of lossy video coding, further compression is performed through, for example, quantization, to reduce an amount of data required for representing video pictures, and the video pictures cannot be completely reconstructed on a decoder side. In other words, quality of reconstructed video pictures is lower or poorer than that of the original video pictures.

The following describes a system architecture used in embodiments of this application. FIG. 1 is a schematic block diagram of an example of a video encoding and decoding system 10 according to an embodiment of this application. As shown in FIG. 1, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. The source device 12, the destination device 14, or various implementation solutions of the source device 12 or the destination device 14 may include one or more processors and a memory coupled to the one or more processors. The memory may include but is not limited to a random access memory (random access memory, RAM), a read-only memory (read-only memory, ROM), an electrically erasable programmable read-only memory (electrically erasable programmable read-only memory, EEPROM), a flash memory, or any other medium that can be used to store desired program code in a form of an instruction or a data structure that can be accessed by a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, an in-vehicle computer, a wireless communications device, or the like.

Although FIG. 1 depicts the source device 12 and the destination device 14 as separate devices, a device embodiment may alternatively include both the source device 12 and the destination device 14 or functionality of both the source device 12 and the destination device 14, that is, the source device 12 or corresponding functionality, and the destination device 14 or corresponding functionality. In such embodiments, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented through a link 13, and the destination device 14 may receive encoded video data from the source device 12 through the link 13. The link 13 may include one or more media or apparatuses capable of moving the encoded video data from the source device 12 to the destination device 14. In an example, the link 13 may include one or more communication media that enable the source device 12 to transmit the encoded video data directly to the destination device 14 in real time. In this example, the source device 12 may modulate the encoded video data according to a communications standard (for example, a wireless communication protocol), and may transmit modulated video data to the destination device 14. The one or more communication media may include a wireless and/or wired communication medium, for example, a radio frequency (RF) spectrum or one or more physical transmission lines. The one or more communication media may constitute a part of a packet-based network, and the packet-based network is, for example, a local area network, a wide area network, or a global network (for example, the Internet). The one or more communication media may include a router, a switch, a base station, or another device that facilitates communication from the source device 12 to the destination device 14.

The source device 12 includes an encoder 20, and optionally, the source device 12 may further include a picture source 16, a picture preprocessor 18, and a communication interface 22. In a specific implementation form, the encoder 20, the picture source 16, the picture preprocessor 18, and the communication interface 22 may be hardware components in the source device 12, or may be software programs in the source device 12. Descriptions are separately provided as follows.

The picture source 16 may include or be any type of picture capture device configured to, for example, capture a real-world picture; and/or any type of device for generating a picture or comment (for screen content encoding, some text on a screen is also considered as a part of a to-be-encoded picture or image), for example, a computer graphics processing unit configured to generate a computer animation picture; and/or any type of device for obtaining and/or providing a real-world picture or a computer animation picture (for example, screen content or a virtual reality (virtual reality, VR) picture); and/or any combination thereof (for example, an augmented reality (augmented reality, AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera, or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processing unit, a computer, or a server. The interface may be any type of interface, for example, a wired or wireless interface or an optical interface, according to any proprietary or standardized interface protocol.

A picture may be considered as a two-dimensional array or matrix of pixels (picture element). In this embodiment of this application, a picture transmitted by the picture source 16 to the picture processor may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion, color correction, or denoising.

The encoder 20 (or referred to as a video encoder 20) is configured to receive the preprocessed picture data 19, and process the preprocessed picture data 19 in a related prediction mode (for example, a prediction mode in the embodiments of this specification), to provide encoded picture data 21 (details of a structure of the encoder 20 are further described below based on FIG. 3). In some embodiments, the encoder 20 may be configured to perform the embodiments described below, to implement the encoding method described in this application.

The communication interface 22 may be configured to receive the encoded picture data 21, and transmit the encoded picture data 21 to the destination device 14 or any other device (for example, a memory) through the link 13 for storage or direct reconstruction. The any other device may be any device configured for decoding or storage. The communication interface 22 may be, for example, configured to encapsulate the encoded picture data 21 into an appropriate format, for example, a data packet, for transmission over the link 13.

The destination device 14 includes a decoder 30. Optionally, the destination device 14 may further include a communication interface 28, a picture post-processor 32, and a display device 34. Descriptions are separately provided as follows.

The communication interface 28 may be configured to receive the encoded picture data 21 from the source device 12 or any other source. The any other source is, for example, a storage device. The storage device is, for example, an encoded picture data storage device. The communication interface 28 may be configured to transmit or receive the encoded picture data 21 through the link 13 between the source device 12 and the destination device 14 or through any type of network. The link 13 is, for example, a direct wired or wireless connection. The any type of network is, for example, a wired or wireless network or any combination thereof, or any type of private or public network, or any combination thereof. The communication interface 28 may be, for example, configured to decapsulate the data packet transmitted through the communication interface 22, to obtain the encoded picture data 21.

Both the communication interface 28 and the communication interface 22 may be configured as unidirectional communication interfaces or bidirectional communication interfaces, and may be configured to, for example, send and receive messages to establish a connection, and acknowledge and exchange any other information related to a communication link and/or data transmission such as encoded picture data transmission.

The decoder 30 (or referred to as a decoder 30) is configured to: receive the encoded picture data 21, and provide a decoded picture data 31 or a decoded picture 31.

The picture post-processor 32 is configured to post-process the decoded picture data 31 (also referred to as reconstructed picture data) to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture, for example, to a user or a viewer. The display device 34 may be or include any type of display configured to present a reconstructed picture, for example, an integrated or external display or monitor. For example, the display may include a liquid crystal display (liquid crystal display, LCD), an organic light emitting diode (organic light emitting diode, OLED) display, a plasma display, a projector, a micro LED display, a liquid crystal on silicon (liquid crystal on silicon, LCoS), a digital light processor (digital light processor, DLP), or any type of other display.

Although FIG. 1 depicts the source device 12 and the destination device 14 as separate devices, a device embodiment may alternatively include both the source device 12 and the destination device 14 or functionality of both the source device 12 and the destination device 14, that is, the source device 12 or corresponding functionality, and the destination device 14 or corresponding functionality. In such embodiments, the source device 12 or the corresponding functionality and the destination device 14 or the corresponding functionality may be implemented by using same hardware and/or software, separate hardware and/or software, or any combination thereof.

As will be apparent for a person skilled in the art based on the descriptions, existence and (exact) split of functionality of the different units or functionality of the source device 12 and/or the destination device 14 shown in FIG. 1 may vary depending on an actual device and application. The source device 12 and the destination device 14 may include any one of a wide range of devices, including any type of handheld or stationary device, for example, a notebook or laptop computer, a mobile phone, a smartphone, a pad or a tablet computer, a video camera, a desktop computer, a set-top box, a television set, a camera, an in-vehicle device, a display device, a digital media player, a video game console, a video bitstreaming transmission device (such as a content service server or a content distribution server), a broadcast receiver device, and a broadcast transmitter device, and may not use or may use any type of operating system.

The encoder 20 and the decoder 30 each may be implemented as any one of various appropriate circuits, for example, one or more microprocessors, digital signal processors (digital signal processor, DSP), application-specific integrated circuits (application-specific integrated circuit, ASIC), field-programmable gate arrays (field-programmable gate array, FPGA), discrete logic, hardware, or any combinations thereof. If the technologies are implemented partially by using software, a device may store software instructions in an appropriate and non-transitory computer-readable storage medium and may execute instructions by using hardware such as one or more processors, to perform the technologies of this disclosure. Any one of the foregoing content (including hardware, software, a combination of hardware and software, and the like) may be considered as one or more processors.

In some cases, the video encoding and decoding system 10 shown in FIG. 1 is merely an example, and the technologies of this application are applicable to video coding settings (for example, video encoding or video decoding) that do not necessarily include any data communication between an encoding device and a decoding device. In other examples, data may be retrieved from a local memory, bitstreamed over a network, or the like. A video encoding device may encode the data and store the data into a memory, and/or a video decoding device may retrieve the data from the memory and decode the data. In some examples, encoding and decoding are performed by devices that do not communicate with each other but simply encode data to the memory and/or retrieve the data from the memory and decode the data.

Figure 2:
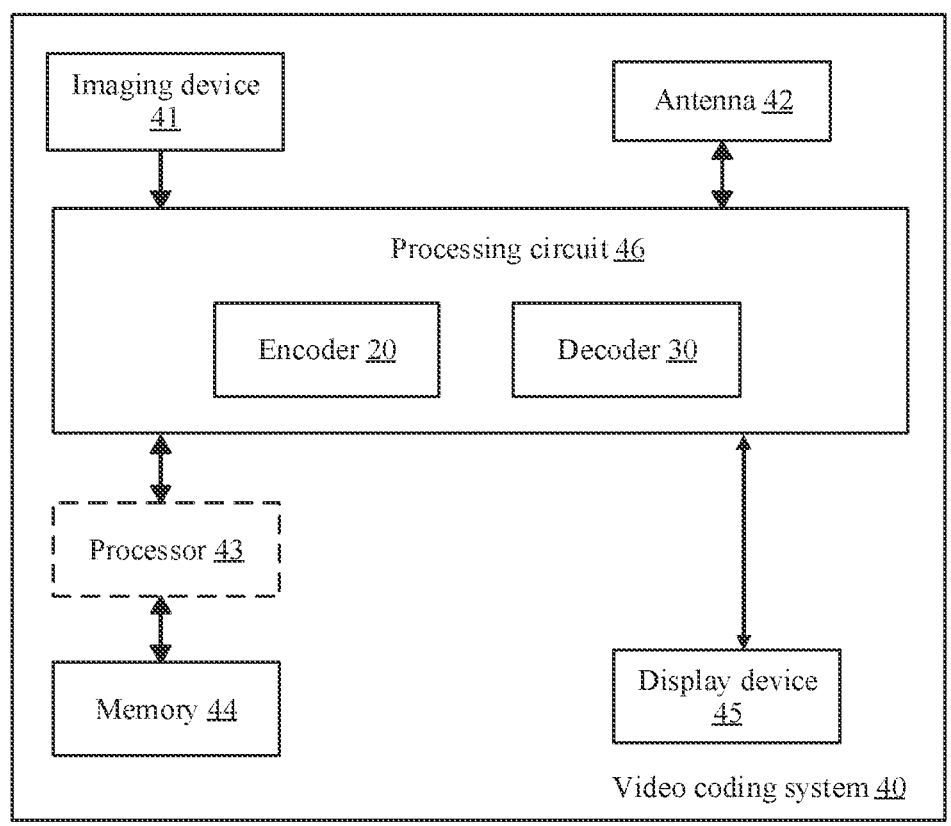
FIG. 2 is a block diagram of a video coding system to which this application is applicable.

FIG. 2 is an illustrative diagram of an example of a video coding system 40 including an encoder and/or a decoder according to an example embodiment. The video coding system 40 can implement a combination of various technologies in embodiments of this application. In an illustrated implementation, the video coding system 40 may include an imaging device 41, the encoder 20, the decoder 30 (and/or a video encoder/decoder implemented by a processing circuit 46), an antenna 42, one or more processors 43, one or more memories 44, and/or a display device 45.

As shown in FIG. 2, the imaging device 41, the antenna 42, the processing circuit 46, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. Further, in some examples, the display device 45 may be configured to present the video data. The processing circuit 46 may include application-specific integrated circuit (application-specific integrated circuit, ASIC) logic, a graphics processing unit, a general-purpose processor, or the like. The video coding system 40 may also include the optional processor 43. The optional processor 43 may similarly include application-specific integrated circuit (application-specific integrated circuit. ASIC) logic, a graphics processing unit, a general purpose processor, or the like. In some examples, the processor 43 may be implemented by using general-purpose software, an operating system, or the like. In addition, the memory 44 may be any type of memory, for example, a volatile memory (for example, a static random access memory (static random access memory, SRAM) or a dynamic random access memory (dynamic random access memory. DRAM)), or a nonvolatile memory (for example, a flash memory). In a non-limiting example, the memory 44 may be implemented by a cache.

In some examples, the antenna 42 may be configured to receive an encoded bitstream of video data. As described, the encoded bitstream may include data, an indicator, an index value, mode selection data, or the like related to video frame encoding described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment of this application, for the example described with reference to the encoder 20, the decoder 30 may be configured to perform an inverse process. With regard to signaling a syntax element, the decoder 30 may be configured to receive and parse such a syntax element and correspondingly decode related video data. In some examples, the encoder 20 may entropy encode the syntax element into an encoded video bitstream. In such examples, the decoder 30 may parse such a syntax element and correspondingly decode related video data.

It should be noted that a video image encoding method described in the embodiments of this application is performed by the encoder 20 and a video image decoding method described in the embodiments of this application is performed by the decoder 30. The encoder 20 and the decoder 30 in the embodiments of this application may be, for example, an encoder/a decoder corresponding to a video standard protocol such as H.263, H.264, HEVV, MPEG-2, MPEG-4, VP8, or VP9, or a next-generation video standard protocol (for example, H.266).

Figure 3:
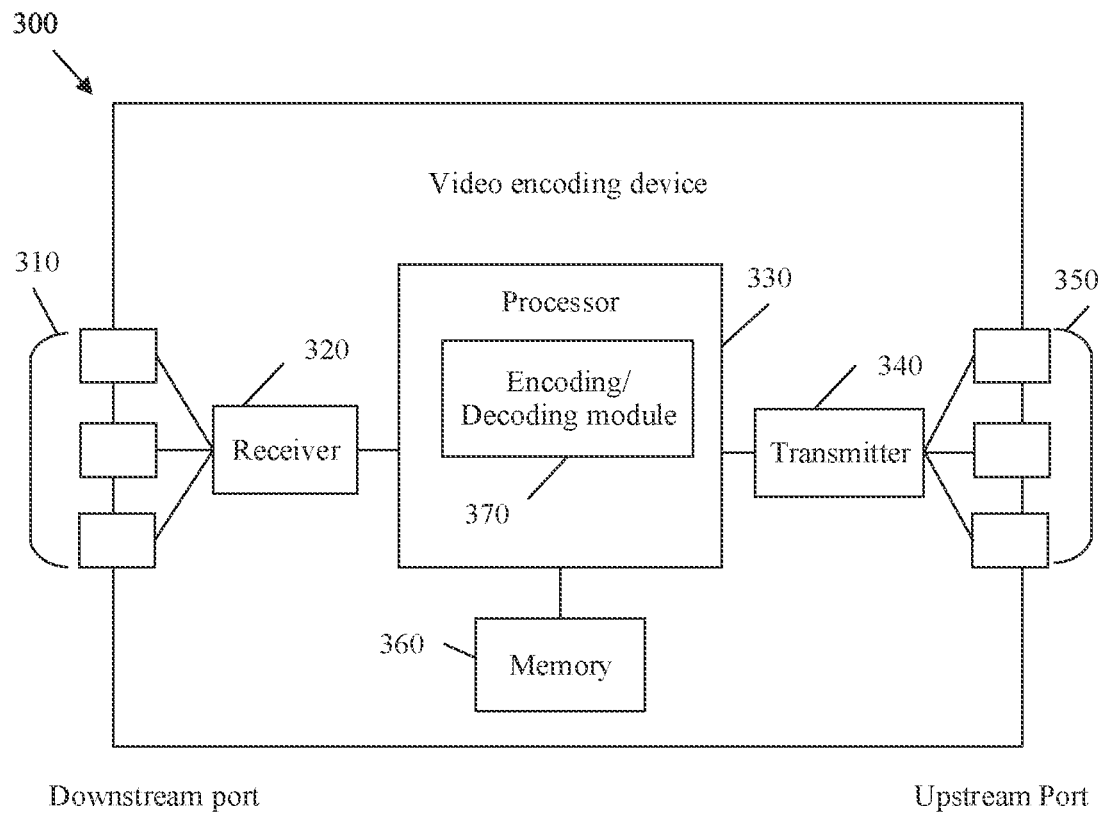
FIG. 3 is a schematic diagram of a structure of a video coding device according to an embodiment of this application.

FIG. 3 is a schematic diagram of a structure of a video coding device 300 (for example, a video encoding device 300 or a video decoding device 300) according to an embodiment of this application. The video coding device 300 is applicable to implementing an embodiment described in this specification. In an embodiment, the video coding device 300 may be a video decoder (for example, the decoder 30 in FIG. 1) or a video encoder (for example, the encoder 20 in FIG. 1). In another embodiment, the video coding device 300 may be one or more components of the decoder 30 in FIG. 1 or of the encoder 20 in FIG. 1.

The video coding device 300 includes: an ingress port 310 and a receiver unit 320 for receiving data; a processor, a logic unit, or a central processing unit 330 for processing data; a transmitter unit 340 (or briefly referred to as a transmitter 340) and an egress port 350 for transmitting data; and a memory 360 (for example, memory 360) for storing data. The video coding device 300 may further include an optical-to-electrical conversion component and an electrical-to-optical component that are coupled to the ingress port 310, the receiver unit 320 (or briefly referred to as a receiver 320), the transmitter unit 340, and the egress port 350 for egress or ingress of optical or electrical signals.

The processor 330 is implemented by hardware and software. The processor 330 may be implemented as one or more CPU chips, cores (for example, a multi-core processor), FPGAs, ASICs, and DSPs. The processor 330 communicates with the ingress ports 310, the receiver units 320, the transmitter units 340, the egress ports 350, and the memory 360. The processor 330 includes a decoding module 370 (for example, an encoding module 370). The encoding module 370 implements the embodiments disclosed in this specification, to implement the encoding method provided in the embodiments of this application. For example, the encoding module 370 implements, processes, or provides various coding operations. Therefore, the encoding module 370 substantially improves functions of the video coding device 300 and affects transform of the video coding device 300 to a different state. Alternatively, the encoding module 370 is implemented as instructions stored in the memory 360 and executed by the processor 330.

The memory 360 includes one or more disks, tape drives, and solid state drives and may be used as an overflow data storage device, to store programs when such programs are selected for execution, and to store instructions and data that are read during program execution. The memory 360 may be volatile and/or non-volatile, and may be a read-only memory, a random access memory, a ternary content-addressable memory (ternary content-addressable memory, TCAM), and/or a static random access memory.

The following describes two prediction modes in this embodiment of this application: block-level prediction and point-level prediction.

Block-level prediction: A coding block is used as a prediction unit, and a pixel in a current coding block cannot be used as a reference pixel for a subsequent pixel in the current coding block.

Point-level prediction: A point is used as a prediction unit, and a pixel in a current coding block may be used as a reference pixel for a subsequent pixel in the current coding block.

A pixel value of the reference pixel mentioned in the block-level prediction or point-level prediction may be used as a reference value of a pixel in the current coding block, to calculate a predicted value of the pixel in the current coding block. The pixel value of the reference pixel may be a reconstructed value of the reference pixel.

Figure 4:
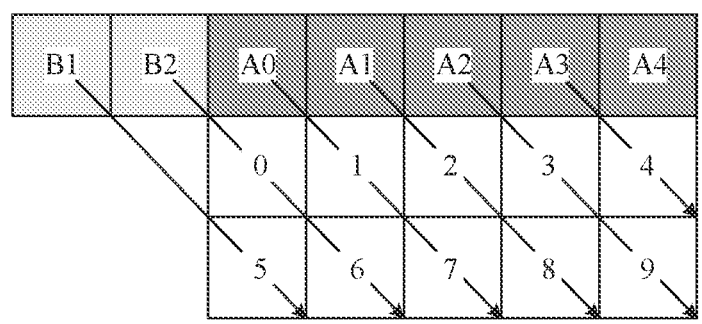
FIG. 4 is a schematic diagram of a block-level prediction according to an embodiment of this application.
Figure 5:
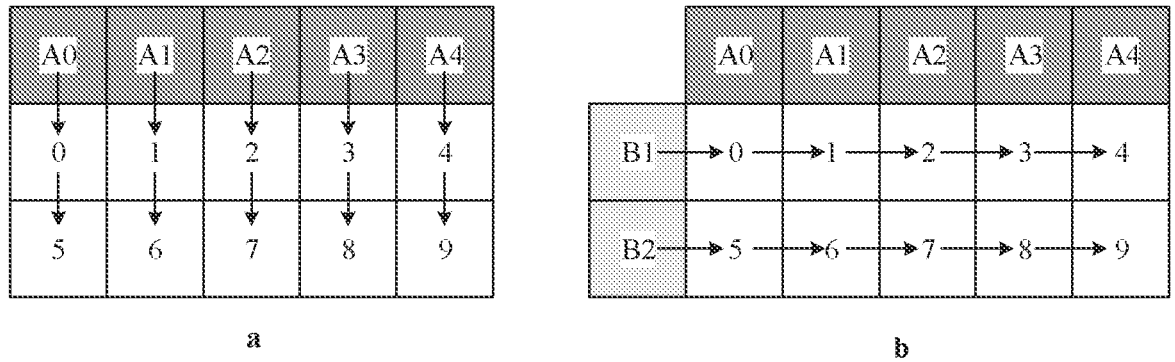
FIG. 5 is schematic diagrams of several point-level prediction modes according to an embodiment of this application.

The following further explains the block-level prediction with reference to the schematic diagram of the block-level prediction mode provided in FIG. 4, and further explains the point-level prediction with reference to schematic diagrams of several prediction modes provided in FIG. 5.

First, it is assumed that the to-be-encoded image is divided, by block, into several coding blocks of equal size, and each coding block includes 10 pixels. In FIG. 4 and FIG. 5, A0, A1, A2, A3, and A4 are five pixels (other five pixels are not shown) included in the coding block A, B1 and B2 are two pixels included in the coding block B (other eight pixels are not shown), and 0, 1, 2, 3, 4, 5, 6, 7, 8, and 9 are 10 pixels included in the current coding block. Arrows in the figures indicate prediction directions. To be specific, a start point of an arrow is a prediction reference pixel, and a pixel that the arrow passes through and an end point of the arrow are to-be-predicted pixels. A direction of an arrow in the figures may indicate a prediction direction of the prediction mode.

As shown in FIG. 4, the pixel B1 is a reference pixel of the pixel 5, the pixel B2 is a reference pixel of the pixel 0 and the pixel 6, the pixel A0 is a reference pixel of the pixel 1 and the pixel 7, the pixel A1 is a reference pixel of the pixel 2 and the pixel 8, the pixel A2 is a reference pixel of the pixel 3 and the pixel 9, the pixel A3 is a reference pixel of the pixel 4, and the like. It can be learned that a pixel in a current coding block may not be used as a reference pixel for a subsequent pixel in the current coding block. For example, the pixel 0 cannot be used as a reference pixel of the pixel 6, and the pixel 1 cannot be used as a reference pixel of the pixel 7. This is block-level prediction.

As shown in a in FIG. 5, the pixel 0 is a reference pixel of the pixel 5, the pixel 1 is a reference pixel of the pixel 6, the pixel 2 is a reference pixel of the pixel 7, the pixel 3 is a reference pixel of the pixel 8, and the pixel 4 is a reference pixel of the pixel 9. It can be learned that a pixel in a current coding block may be used as a reference pixel for a subsequent pixel in the current coding block. This is point-level prediction.

As shown in b in FIG. 5, the pixel 0 is a reference pixel of the pixel 1, the pixel 1 is a reference pixel of the pixel 2, the pixel 7 is a reference pixel of the pixel 8, and the like. It can be learned that a pixel in a current coding block may be used as a reference pixel for a subsequent pixel in the current coding block. This is point-level prediction.

It can be learned from directions of arrows that, the two types of point-level predictions in a and b in FIG. 5 have different prediction directions. A prediction direction of a in FIG. 5 is a vertical direction, and a prediction direction of b in FIG. 5 is a horizontal direction. A prediction direction of the block-level prediction in FIG. 4 is a lower-right diagonal direction.

The prediction modes are not limited to the several prediction modes shown in FIG. 5. In a specific implementation, other prediction modes may also be used, and different prediction modes have different prediction directions and/or different prediction value calculation methods. The prediction value calculation method is how to calculate a prediction value of a current coding pixel based on a value of a reference pixel. For example, the value of the reference pixel may be directly used as the prediction value of the current coding pixel, or an average value of the reference pixel and values of other pixels around the reference pixel may be used as the prediction value of the current coding pixel. A specific prediction direction of a prediction mode and a prediction value calculation method are not limited in this embodiment of this application.

Figure 6:
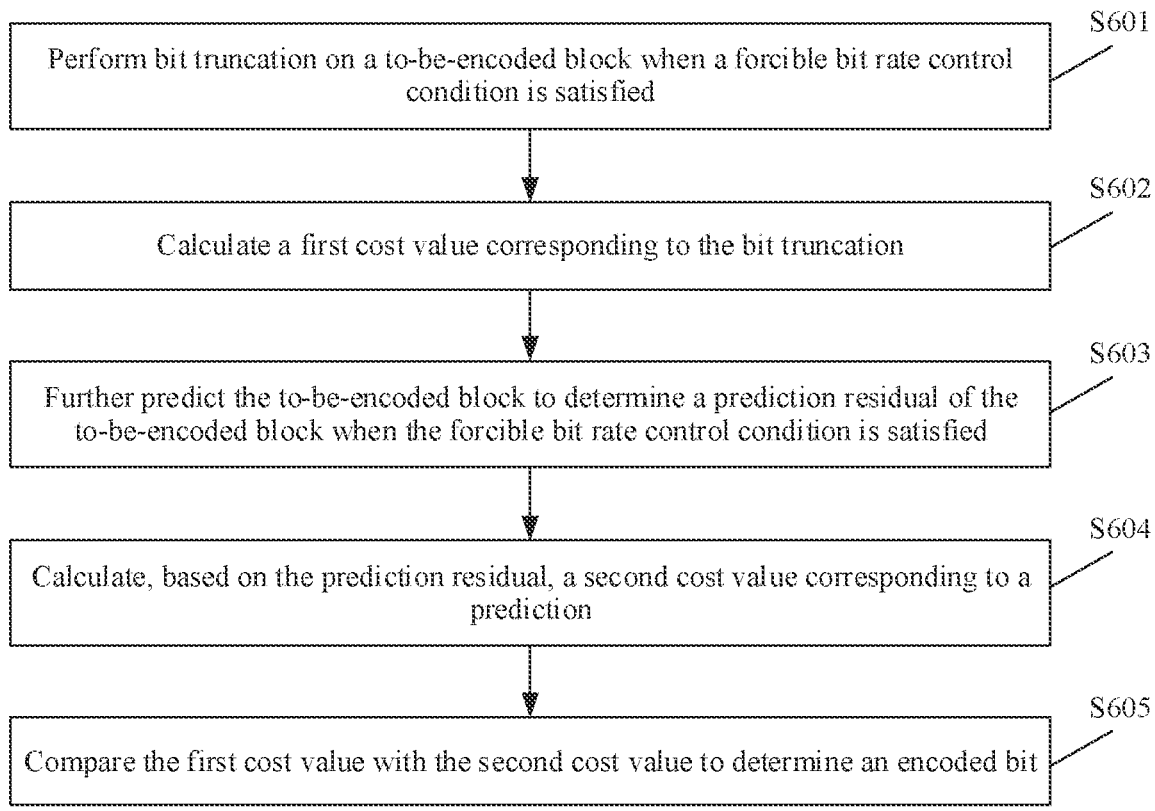
FIG. 6 is a schematic flowchart of an encoding method according to an embodiment of this application.

The following describes an encoding method provided in this embodiment of this application with reference to FIG. 6. FIG. 6 is a schematic flowchart of an encoding method according to an embodiment of this application. As shown in FIG. 6, the encoding method may include at least the following steps.

S601: Perform bit truncation on a to-be-encoded block when a forcible bit rate control condition is satisfied.

Possibly, the forcible bit rate control condition may be that a fullness status of a bitstream buffer reaches a specified level. For example, when the fullness status of the bitstream buffer reaches 90%, forcible bit rate control needs to be performed. The forcible bit rate control condition is that the fullness status of the bitstream buffer is greater than or equal to 90%. The fullness status of the bitstream buffer is indicated by a percentage. The percentage is a ratio of a used capacity to a total capacity of the bitstream buffer. The fullness status of the bitstream buffer is not limited to being indicated by a percentage. In a specific implementation, the fullness status of the bitstream buffer may be indicated by a value. This is not limited in this embodiment of this application.

The bitstream buffer may be a buffer memory, used to buffer encoded data, so that the encoded data is output at a stable bit rate. It can be learned that the bitstream buffer may have another name in different standards, for example, a video buffer detector and an encoded image buffer. A specific name of the bitstream buffer is not limited in this embodiment of this application.

Possibly, the forcible bit rate control condition may alternatively be an overall impact result of the fullness status of the bitstream buffer and a size of a prediction residual. For example, when the fullness status of the bitstream buffer reaches a specified level (for example, being greater than or equal to 90%), but prediction residuals are all less than a threshold (for example, all 0). In this case, it is still determined that the forcible bit rate control condition is not satisfied. The forcible bit rate control condition may be that a fullness status of a bitstream buffer reaches a specified level and a prediction residual is greater than a threshold.

Possibly, the bit truncation may be performed on a pixel value of a current coding pixel in the to-be-encoded block. RGB color space is used as an example. If each component has 256 luminance levels, and needs eight bits for transmission. The bit truncation may be truncating some of the eight bits. Truncated bits are reserved and transmitted bits. A quantity of truncated bits may be determined based on the fullness status of the bitstream buffer. A more full current bitstream buffer indicates more urgently a bit rate needs to be reduced in a current system. In this case, fewer bits are truncated.

In some possible implementations, high-order bits may be truncated. To be specific, low-order bits are set to zero, and the high-order bits are reserved for transmission, to reduce the bit rate.

Specifically, for a high-amplitude pixel, the low-order bits may be set to zero, and the high-order bits are reserved. It is assumed that R, G, and B components of a pixel are 240, 248, and 241 respectively, and bits of the R component are 11110000, bits of the G component are 11111000, and bits of the B component are 11110001. The R component is used as an example. If it is determined, based on a current fullness status of the bitstream buffer, that four bits need to be truncated, high-order four bits of the R component may be truncated, that is, low-order four bits are set to 0. In this case, a luminance value of the R component does not change after the truncation, and is still 240. For the G component, after the low-order four bits are set to 0, the bits change from 11111000 to 11110000, that is, from 248 to 240, and the luminance value does not change significantly. Similarly, the luminance value does not change significantly after the high-order four bits of the B component are truncated. It can be learned that, for specific image content, high-order bit truncation can effectively reduce the bit rate and ensure image encoding quality.

In some other possible implementations, low-order bits may be truncated. To be specific, high-order bits are set to zero, and the low-order bits are reserved for transmission.

Specifically, for a low-amplitude pixel, the high-order bits may be set to zero, and the low-order bits are reserved. It is assumed that R, G, and B components of a pixel are 13, 6, and 1 respectively, and bits of the R component are 00001101, bits of the G component are 00000110, and bits of the B component are 00000001. The R component is used as an example. If it is determined, based on a current fullness status of the bitstream buffer, that four bits need to be truncated, low-order four bits of the R component may be truncated, that is, high-order four bits are set to 0. In this case, a luminance value of the R component does not change after the truncation, and is still 13. The same applies to the G component and the B component. It can be seen that, for specific image content, low-order bit truncation can effectively reduce the bit rate and ensure image encoding quality.

Possibly, the bit truncation may be performed on a prediction residual of a current coding pixel in the to-be-encoded block. Specifically, each pixel in the to-be-encoded block may be predicted through the point-level prediction or the block-level prediction, and a prediction residual of each pixel is separately output. Then, the bit truncation is performed on the prediction residual. The prediction residual is a difference between an original value and a prediction value. The original value is a pixel value of a current coding pixel, and the prediction value is a prediction value of the current coding pixel. Bit truncation mode of the prediction residual is similar to that of the pixel value of the current coding pixel. For details, refer to the foregoing related descriptions of the bit truncation of the pixel value of the current coding pixel. Details are not described herein again.

In this embodiment of this application, the bit truncation is referred to as forcible bit rate control of a spatial-domain branch. In the following embodiments of this application, a bit truncation mode of a pixel value of a to-be-encoded pixel may be referred to as a forcible bit rate control mode 1 of the spatial-domain branch, a bit truncation mode of a prediction residual of the to-be-encoded pixel is referred to as a forcible bit rate control mode 2 of the spatial-domain branch.

S602: Calculate a first cost value corresponding to the bit truncation.

Possibly, a method for calculating a cost may include any one of the following: an encoding bit rate (rate, R), an encoding bit rate-distortion cost (rate-distortion cost, RDCOST), an encoding distortion magnitude, or the like. The encoding distortion magnitude may be measured by using a measure such as an SAD, an MAD, an SSD, an SSE, and an MSE. The method for calculating the cost is not limited in this embodiment of this application.

Specifically, if the bit truncation is performed on a pixel value of the current coding pixel in the to-be-encoded block, the first cost value is a cost value corresponding to the bit truncation performed on the pixel value of the current coding pixel. If the bit truncation is performed on the prediction residual of the current coding pixel in the to-be-encoded block, the first cost value is a cost value corresponding to the bit truncation performed on the prediction residual of the current coding pixel in the to-be-encoded block.

S603: Further predict the to-be-encoded block to determine a prediction residual of the to-be-encoded block when the forcible bit rate control condition is satisfied.

Specifically, the forcible bit rate control condition is the same as that described in S601, and details are not described herein again.

Specifically, when the forcible bit rate control condition is satisfied, the to-be-encoded block is further predicted, which may be considered as a forcible bit rate control mode of a frequency domain branch. The prediction of the frequency domain branch may be block-level prediction. Specifically, the to-be-encoded block may be predicted in a target prediction mode, to determine a difference between the original value and the prediction value, that is, the prediction residual. The target prediction mode may be block-level prediction.

S604: Calculate, based on the prediction residual, a second cost value corresponding to the prediction.

Possibly, after the block-level prediction on the to-be-encoded block, frequency domain transformation can be performed on the prediction residual to obtain N frequency domain transform coefficients of the prediction residual. M1 frequency domain transform coefficients in the N frequency domain transform coefficients are set to zero to obtain N zeroed frequency domain transform coefficients. Then the N zeroed frequency domain transform coefficients are quantized. The second cost value is an encoding cost value obtained after the N zeroed frequency domain transform coefficients are quantized. In this embodiment of this application, transform coefficients are quantized after being set to zero, so that transform coefficients that need to be quantized can be reduced. N and M1 are both positive integers, and M1 is less than N.

Possibly, after the block-level prediction on the to-be-encoded block, frequency domain transformation can be performed on the prediction residual to obtain N frequency domain transform coefficients of the prediction residual. Then, the N frequency domain transform coefficients are quantized, and M2 frequency domain transform coefficients of the N quantized frequency domain transform coefficients are set to zero to obtain the N zeroed frequency domain transform coefficients. The second cost value is a corresponding encoding cost value for setting the M2 frequency domain transform coefficients to zero. N and M2 are both positive integers, and M2 is less than N.

Compared with a mode in which transform coefficients are quantized after being set to zero, a mode in which quantized transform coefficients are set to zero in this embodiment of this application can retain more transform coefficients, that is, retain more frequency components (M2 may be less than or equal to M1). This helps improve quality of image of specific content.

Possibly, after the block-level prediction on the to-be-encoded block, the frequency domain transformation can be performed on the prediction residual to obtain N frequency domain transform coefficients of the prediction residual. Then M3 frequency domain transform coefficients of the N frequency domain transform coefficients are set to zero, and transform coefficients are not quantized. The second cost value is a corresponding encoding cost value for setting the M3 frequency domain transform coefficients to zero. The setting the M3 frequency domain transform coefficients to zero may be implemented through quantization. In this embodiment of this application, transform coefficients need only to be set to zero, but does not need to be additionally quantized. This simplifies a calculation method and an encoding architecture. In this embodiment of this application, M1, M2, and M3 may be collectively referred to as M.

A quantity M of the zeroed transform coefficients may be determined based on the fullness status of the bitstream buffer. Currently, a more full current bitstream buffer indicates that a bit rate needs to be reduced in a current system more urgently. In this case, the quantity M of the zeroed transform coefficients increases. Because human eyes are insensitive to high-frequency signals, zeroed coefficients may be transform coefficients corresponding to high-frequency components. This can ensure that an image loss is not perceived by human eyes after the coefficients are discarded.

The two cost calculation methods corresponding to the second cost value are described in S602, and may be an encoding bit rate, an RDCOST, an encoding distortion magnitude, or the like. The encoding distortion magnitude may be measured by using a measure such as an SAD, an MAD, an SSD, an SSE, and an MSE. The encoding distortion magnitude may be specifically a difference between residual information before transformation and residual information after inverse transformation.

The mode in which M (or M1, or M2, or M3) frequency domain transform coefficients in the N frequency domain transform coefficients are set to zero may be considered as discarding some transform coefficients of the frequency domain branch.

Possibly, after the block-level prediction on the to-be-encoded block, an encoding cost value can be directly calculated. To be specific, the second cost value is an encoding cost value corresponding to a prediction residual obtained after transform coefficients are discarded after the block-level prediction. In this case, it may be considered that after the frequency domain transformation is performed on the prediction residual to obtain the N frequency domain transform coefficients of the prediction residual, all the N frequency domain transform coefficients are set to zero. This mode may be considered as discarding all the transform coefficients of the frequency domain branch. In this application, discarding all transform coefficients and discarding some transform coefficients may be collectively referred to as coefficient discarding of a frequency domain branch.

For a cost calculation method corresponding to the second cost value, refer to the description in S602. Details are not described herein again.

In this embodiment of this application, setting the transform coefficients to zero (coefficient discarding) may be referred to as forcible bit rate control of a frequency domain branch. In the following embodiments of this application, a mode in which transform coefficients are quantized and then partially discarded may be referred to as a forcible bit rate control mode 1 of the frequency domain branch, a mode in which some coefficients are discarded and then quantized is referred to as a forcible bit rate control mode 2 of the frequency domain branch, and a mode in which all the transform coefficients are discarded is referred to as a forcible bit rate control mode 3 of the frequency domain branch.

S605: Compare the first cost value with the second cost value to determine an encoded bit.

Specifically, the first cost value and the second cost value are compared to determine an optimal forcible bit rate control mode, and the to-be-encoded block is further encoded based on the optimal forcible bit rate control mode to obtain a final encoded bit.

Possibly, the encoded bit may further carry an encoding mode of the encoded bit. The encoding mode may be the forcible bit rate control mode 1 of the spatial-domain branch, the forcible bit rate control mode 2 of the spatial-domain branch, the forcible bit rate control mode 1 of the frequency domain branch, the forcible bit rate control mode 2 of the frequency domain branch, or the forcible bit rate control mode 3 of the frequency domain branch, so that the decoder can decode the encoded bit based on the encoding mode of the encoded bit.

If it is determined that the optimal forcible bit rate control mode is the forcible bit rate control mode 1 of the spatial-domain branch, it is determined that the encoded bit is an encoded bit obtained after the bit truncation is implemented on the current coding pixel. If it is determined that the optimal forcible bit rate control mode is the forcible bit rate control mode 2 of the spatial-domain branch, it is determined that the encoded bit is an encoded bit obtained after the bit truncation is implemented on the prediction residual of the current coding pixel. If the optimal forcible bit rate control mode is the forcible bit rate control mode 1 of the frequency domain branch, it is determined that the encoded bit is an encoded bit obtained after entropy encoding is performed on the zeroed transform coefficients. If the optimal forcible bit rate control mode is the forcible bit rate control mode 2 of the frequency domain branch, it is determined that the encoded bit is an encoded bit obtained after the entropy encoding is performed on the quantized transform coefficients. If the optimal forcible bit rate control mode is the forcible bit rate control mode 3 of the frequency domain branch, it is determined that the encoded bit is an encoded bit obtained after the entropy encoding is performed on all 0 transform coefficients that are of prediction residual information and that are discarded after the block-level prediction. It can be learned that a finally determined encoded bit is definitely less than an output bit of the bitstream buffer, to prevent bitstream buffer overflow.

Specifically, the first cost value and the second cost value may be calculated according to the encoding cost rule. The encoding cost value is usually directly proportional to an encoding cost. However, in a calculation rule, the encoding cost value may alternatively be inversely proportional to the encoding cost. For example, the encoding cost value is a sum of reciprocals of absolute values of prediction residuals of all pixels. In such calculation rule in which the encoding cost value is inversely proportional to the prediction residual, the encoding cost value is inversely proportional to the encoding cost.

The encoding cost rule is not limited in this embodiment of this application. However, an optimal forcible bit rate control mode is always a prediction mode with a lowest encoding cost for any encoding cost calculation rule.

When the first cost value is equal to the second cost value, bit truncation mode of the spatial-domain or coefficient discarding mode of the frequency domain may be randomly selected to control the bit rate. An output encoded bit is an encoded bit obtained after the bit truncation or an encoded bit obtained after the entropy encoding is performed on transform coefficients. In this embodiment of this application, a forcible bit rate control mode selected when cost values are equal is not limited.

In this embodiment of this application, when a system needs to forcibly control a bit rate, the system predicts potential encoding costs caused after the bit rate is controlled by using such two different modes, that is, bit truncation of the spatial-domain branch and coefficient discarding of the frequency domain branch, selects a mode with a lower encoding cost to control the bit rate, and finally outputs the encoded bit. This can allow the limited encoded bit output to carry useful information (that is, information that can be easily perceived by human eyes) as much as possible, and improve image decoding quality while ensuring that the encoding bit rate meets the limitations on system memory and the bandwidth.

Figure 7A:
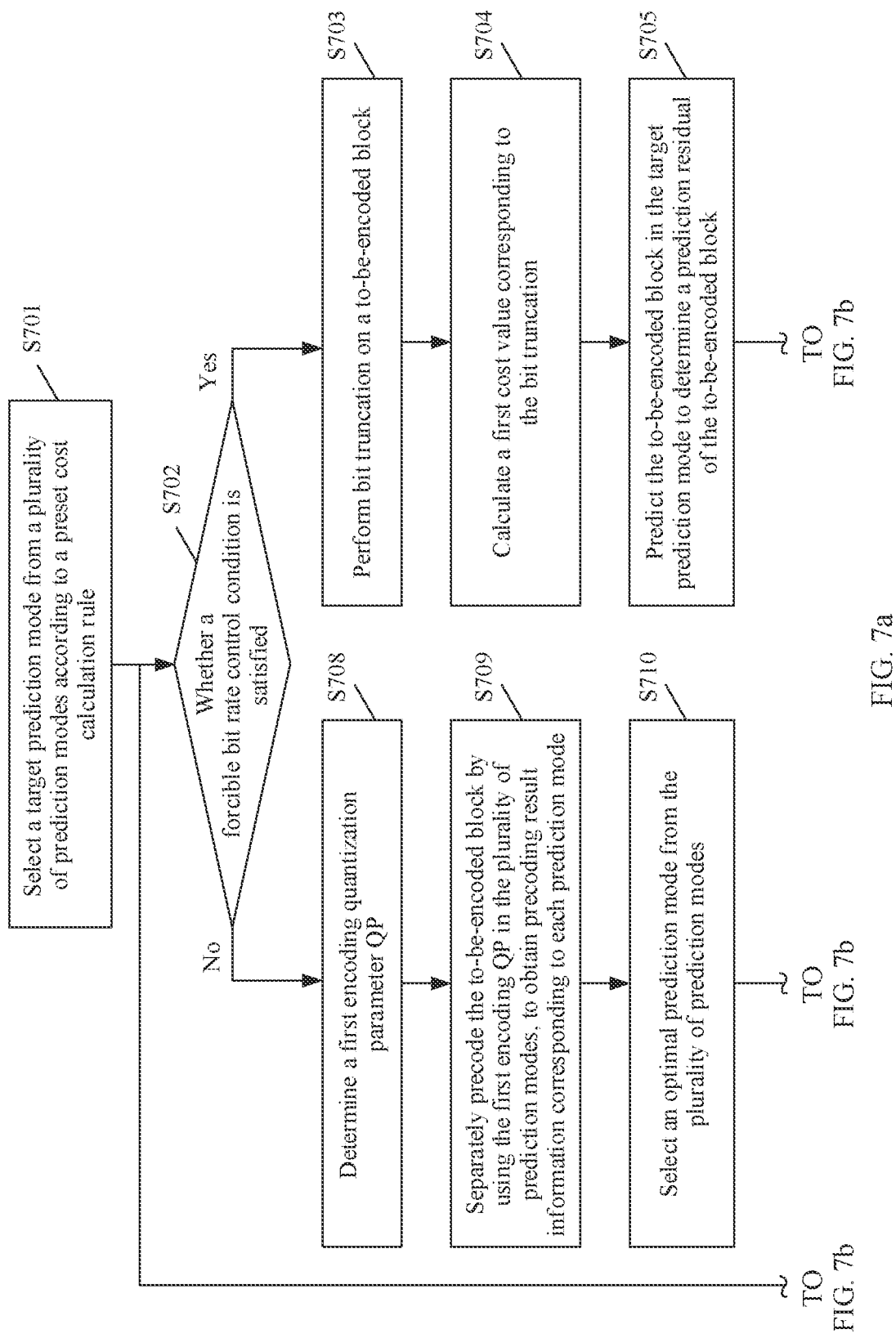

The following describes a detailed encoding method provided in this embodiment of this application. As shown in FIG. 7a and FIG. 7b, the encoding method may include the following steps.

S701: Select a target prediction mode from a plurality of prediction modes according to a preset cost rule.

Specifically, the at least one optimal spatial-domain prediction mode may be selected from a plurality of spatial-domain prediction modes, and the at least one optimal frequency domain prediction mode may be selected from a plurality of frequency domain prediction modes. Specifically, the spatial-domain prediction mode may be point-level prediction or block-level prediction. Different spatial-domain prediction modes correspond to different prediction directions and/or different prediction value calculation methods. The frequency domain prediction mode may be block-level prediction. Different frequency domain prediction modes correspond to different prediction directions and/or different prediction value calculation methods.

Specifically, the at least one optimal spatial-domain prediction mode is at least one spatial-domain prediction mode with a smaller encoding cost in the plurality of spatial-domain prediction modes, and the at least one optimal frequency domain prediction mode is at least one frequency domain prediction mode with a smaller encoding cost in the plurality of frequency domain prediction modes. It should be understood that, the at least one spatial-domain prediction mode (or frequency domain prediction mode) with a smaller encoding cost in the plurality of spatial-domain prediction modes (or frequency domain prediction modes) may be at least one spatial-domain prediction mode (or frequency domain prediction mode) that ranks higher in the plurality of spatial-domain prediction modes (or frequency domain prediction modes) in ascending order of encoding costs, or at least one spatial-domain prediction mode (or frequency domain prediction mode) that ranks lower in the plurality of spatial-domain prediction modes (or frequency domain prediction modes) in descending order of encoding costs. In this embodiment of this application, a S701 process may be referred to as a pre-analysis.

A calculation rule of the encoding costs in a pre-analysis phase may be any one of the following: an SAD of residual information, an MAD of residual information, an SSE of residual information, an MSE of residual information, an encoding bit rate R, an RDCOST, an encoding distortion magnitude, and the like. The encoding distortion magnitude may be measured by using a measure such as an SAD, an MAD, an SSE, and an MSE. The residual information is a difference between an original value and a prediction value.

Encoding cost values of spatial-domain precoding and frequency domain precoding may be calculated according to the encoding cost rule. An encoding cost value is usually directly proportional to an encoding cost. However, in a calculation rule, the encoding cost value may alternatively be inversely proportional to the encoding cost. For example, the encoding cost value is a sum of reciprocals of absolute values of prediction residuals of all pixels. In such calculation rule in which the encoding cost value is inversely proportional to the prediction residual, the encoding cost value is inversely proportional to the encoding cost.

The calculation rule of the encoding costs in the pre-analysis phase is not limited in this embodiment of this application. However, an optimal prediction mode is always a prediction mode with a lowest encoding cost for any encoding cost calculation rule.

S702: Determine whether a forcible bit rate control condition is satisfied, and if the condition is satisfied, perform S703, or if the condition is not satisfied, perform S708.

Specifically, the forcible bit rate control condition may be that a fullness status of a bitstream buffer reaches a specified level, or may be an overall impact result of the fullness status of the bitstream buffer and a size of a prediction residual. For example, when the fullness status of the bitstream buffer reaches a specified level (>90%), but prediction residuals are all less than a threshold (for example, all 0). In this case, it is still determined that the forcible bit rate control condition is not satisfied. The forcible bit rate control condition may be that the fullness status of the bitstream buffer reaches the specified level and a prediction residual is greater than a threshold. For details, refer to descriptions about the forcible bit rate control condition in S601. Details are not described herein again.

S703: Perform bit truncation on a to-be-encoded block.

Specifically, S703 is the same as S601, and details are not described herein again.

It can be learned that, if the bit truncation is performed on a prediction residual of a current coding pixel in the to-be-encoded block, the to-be-encoded block may be predicted in the at least one optimal spatial-domain prediction mode determined in S701, and then the bit truncation is performed on the prediction residual.

S704: Calculate a first cost value corresponding to the bit truncation.

Specifically, S704 is the same as S602, and details are not described herein again.

S705: Predict the to-be-encoded block to determine a prediction residual of the to-be-encoded block.

Specifically, the block-level prediction mode may be the at least one optimal frequency domain prediction mode determined m S701. The to-be-encoded block is separately predicted in at least one optimal prediction mode, to determine at least one prediction residual of the to-be-encoded block.

S706: Calculate, based on the prediction residual, a second cost value corresponding to the prediction.

Specifically, a second cost value corresponding to each optimal frequency domain prediction mode may be calculated based on each prediction residual. A calculation method of each second cost value is consistent with related descriptions in S604. Details are not described herein again.

To be specific, S705 to S706 may be correspondingly performed once for each optimal frequency domain prediction mode, and finally at least one second cost value is obtained.

The S703 to S704 and S705 to S706 may be synchronously performed. An execution sequence of the steps is not limited in this embodiment of this application.

S707: Compare the first cost value with the second cost value to determine an encoded bit.

Possibly, the encoded bit may further carry an encoding mode of the encoded bit. The encoding mode may be the forcible bit rate control mode 1 of the spatial-domain branch, the forcible bit rate control mode 2 of the spatial-domain branch, the forcible bit rate control mode 1 of the frequency domain branch, the forcible bit rate control mode 2 of the frequency domain branch, or the forcible bit rate control mode 3 of the frequency domain branch, so that the decoder can decode the encoded bit based on the encoding mode of the encoded bit.

Specifically, if there are a plurality of second cost values, the first cost value may be compared with the plurality of second cost values to determine a forcible bit rate control mode with a lowest encoding cost. If the forcible bit rate control mode with the lowest encoding cost is bit truncation, the encoded bit is an encoded bit obtained after the bit truncation. If the forcible bit rate control mode with the lowest encoding cost is block-level prediction performed on a to-be-encoded block in an optimal frequency domain prediction mode, the encoded bit is an encoded bit obtained after entropy encoding is performed on the prediction residual of the to-be-encoded block in the optimal frequency domain prediction mode.

S708: Determine a first encoding quantization parameter QP.

Specifically, the first encoding QP may be determined based on texture complexity of the to-be-encoded block and/or the fullness status of the bitstream buffer.

Specifically, the first encoding QP may be directly proportional to the texture complexity of the to-be-encoded block. A more complex texture of the to-be-encoded block indicates a larger first encoding QP. A simpler texture of the to-be-encoded block indicates a smaller first encoding QP.

It can be learned that, a higher texture complexity of the to-be-encoded block indicates less obvious image distortion caused by quantization and less perceptible to human eyes. A larger first encoding QP may be used to reduce a bit rate that may be occupied after the to-be-encoded block is encoded. A simpler texture of the to-be-encoded block indicates more obvious image distortion caused by quantization and more perceptible to human eyes. The first encoding QP may be decreased to reduce the distortion, to ensure that the image distortion is not perceived by human eyes.

Specifically, the first encoding QP may be directly proportional to the fullness status of the bitstream buffer. A fuller bitstream buffer indicates a larger first encoding QP. A more idle bitstream buffer indicates a smaller first encoding QP.

It can be learned that, for the fuller bitstream buffer, the possible bit rate of the to-be-encoded block needs to be reduced to prevent bitstream buffer overflow. This may be specifically implemented by using a larger first encoding QP. A more idle bitstream buffer indicates a surplus in a current bit rate. The possible bit rate of the to-be-encoded block may be raised to increase image information carried after the to-be-encoded block is encoded, so that a decoded image is restored to a higher degree. This may be specifically implemented by using a smaller first encoding QP.

In a specific implementation, the texture complexity may be quantized, and first encoding QPs corresponding to different degrees of texture complexity may be set. The fullness status of the bitstream buffer may also be quantized, and first encoding QPs corresponding to different fullness statuses may be set.

If the first encoding QP can be determined based on both the texture complexity of the to-be-encoded block and the fullness status of the bitstream buffer, the first encoding QPs corresponding to the degrees of texture complexity and the fullness statuses may be combined to obtain a final first encoding QP. Specifically, the first encoding QPs corresponding to the degrees of texture complexity and the fullness statuses may be averaged or weighted summed to obtain the final first encoding QP. Each weight of the degrees of texture complexity and the fullness statuses may be a default weight obtained based on priori information.

Possibly, based on statistical information of a currently encoded coding block, texture complexity of the coding block and a correspondence between the first encoding QP and the encoding bit rate may be obtained. For the to-be-encoded block, the first encoding QP may be determined by searching the correspondence based on the texture complexity of the to-be-encoded block and the encoding bit rate. The encoding bit rate of the to-be-encoded block may be determined based on a current fullness status of the bitstream buffer.

The foregoing mode for determining the first encoding QP is merely an example for description. In a specific implementation, another determining mode may be used. This is not limited in this embodiment of this application.

S709: Separately precode the to-be-encoded block by using the first encoding QP in a plurality of prediction modes, to obtain precoding result information corresponding to each prediction mode.

Specifically, the precoding may be an estimated encoding result of the to-be-encoded block based on the priori information (or historical statistical information). The priori information or the historical statistics information may be information about the currently encoded coding block. Alternatively, the precoding may be encoding the to-be-encoded block in advance, to obtain an encoding result of the to-be-encoded block.

The precoding may include spatial-domain precoding and frequency domain precoding. The spatial-domain precoding may include prediction, quantization, and cost calculation. The frequency domain precoding may include prediction, transformation, quantization, and cost calculation. The optimal spatial-domain prediction mode determines a prediction value of the to-be-encoded block and further determines residual information of the to-be-encoded block. The optimal frequency domain mode also determines the prediction value of the to-be-encoded block, and further determines the residual information of the to-be-encoded block.

The prediction may be determining the prediction value and the prediction residual of the to-be-encoded block based on a prediction reference direction and a prediction value calculation method that correspond to a prediction mode.

The transformation may be frequency domain transformation on the prediction residual, to obtain a transform coefficient in a transform domain.

Quantization in the spatial-domain precoding may be quantizing the prediction residual by using the first encoding QP. Quantization in the frequency domain precoding may be quantizing the transform coefficient by using the first encoding QP.

Cost calculation in spatial-domain precoding may be calculating an encoding cost corresponding to the quantization of the prediction residual. Cost calculation in frequency domain precoding may be calculating an encoding cost corresponding to quantization of the transform coefficient.

Possibly, a method for calculating a cost in a precoding phase may include any one of the following: an encoding bit rate, an encoding bit rate-distortion cost (rate-distortion cost, RDCOST), an encoding distortion magnitude, or the like. The encoding distortion magnitude may be measured by using a measure such as a sum of absolute difference (sum of absolute difference, SAD), a mean absolute difference (mean absolute difference, MAD), a sum of squared difference (sum of squared difference, SSD), a sum of squared error (sum of squared error, SSE), and a mean squared error (mean squared error, MSE).

Specifically, the precoding result information may include at least one of the following: a quantity of encoded bits of the to-be-encoded block in the first encoding QP, an encoding distortion magnitude of the to-be-encoded block in the first encoding QP, an RDCOST of the to-be-encoded block in the first encoding QP, the prediction residual of the to-be-encoded block, and the texture complexity of the to-be-encoded block.

For the spatial-domain precoding, the encoding distortion magnitude may be a difference between residual information before quantization and residual information after inverse quantization. For the frequency domain precoding, the encoding distortion magnitude may be a difference between residual information before transformation and residual information after inverse transformation, or may be a difference between residual information after transformation and before quantization and residual information after inverse quantization and before inverse transformation.

It can be learned that the to-be-encoded block may include a plurality of pixels, and each pixel corresponds to a difference of one residual information (before quantization and after inverse quantization, or before transformation and after inverse transformation). In other words, the to-be-encoded block may include a plurality of differences of the residual information. The encoding distortion magnitude may be a final value obtained by calculating the plurality of differences as one value through a calculation rule (for example, an SAD, an MAD, an SSE, or an MSE).

Rate-distortion cost estimation is to select a proper encoding method, to ensure less distortion with a small bit rate. The rate-distortion cost may be used to measure an image encoding result by combining the encoding bit rate and the distortion magnitude. A smaller rate-distortion cost indicates better image encoding performance. RDCOST=D+$\lambda$*R, where D is a distortion magnitude, R is a bit rate, $\lambda$ is a Lagrangian optimization factor, and a value of $\lambda$ may be positively correlated with the first encoding QP and a fullness degree of the bitstream buffer.

S710: Select an optimal prediction mode from the plurality of prediction modes.

Specifically, the optimal prediction mode is a prediction mode with a smallest encoding cost in the at least one optimal spatial-domain prediction mode and the at least one optimal frequency domain prediction mode.

S711: Adjust the first encoding QP by using encoding result information corresponding to the optimal prediction mode, to obtain a second encoding QP.

Specifically, different prediction modes correspond to different precoding result information in the precoding phase. After the optimal prediction mode is determined, the first encoding QP can be adjusted by using precoding result information corresponding to the optimal prediction mode, to obtain the second encoding QP.

Possibly, the encoding result information includes a quantity of encoded bits of the to-be-encoded block in the first encoding QP. If the quantity of encoded bits is less than a target quantity of bits, the first encoding QP may be decreased. If the quantity of encoded bits is greater than the target quantity of bits, the first encoding QP may be increased.

The target quantity of bits of the to-be-encoded block is determined based on the fullness status of the bitstream buffer and a quantity of output bits of the bitstream buffer. A fuller bitstream buffer indicates a larger decrease in the quantity of target bits of the to-be-encoded block based on the quantity of output bits of the bitstream buffer. A more idle bitstream buffer indicates a larger increase in the quantity of target bits of the to-be-encoded block based on the quantity of output bits of the bitstream buffer.

It can be learned that the quantity of output bits of the bitstream buffer can be determined based on a current target bit rate of an encoder. For example, if the current target bit rate of the encoder is 1 megabit per second (Mbps), and a current frame rate is 30 frames per second, each frame of image is divided into 30 coding blocks. If bit rates are evenly distributed to each coding block, a current quantity of output bits of the bitstream buffer may be 1 megabit/(30*30). The method in which the quantity of output bits of the bitstream buffer is calculated by using the target bit rate of the encoder is merely an example for description. In a specific implementation, there may be another calculation method (for example, bit rates are not evenly distributed to each coding block). This is not limited in this embodiment of this application.

For example, the quantity of output bits of the bitstream buffer is 100 bits (bit). When the fullness status of the bitstream buffer is 50%, the target quantity of bits is equal to the quantity of output bits. When a current fullness status of the bitstream buffer is 60%, the target quantity of bits is 90 bits. When the current fullness status of the bitstream buffer is 80%, the target quantity of bits is 70 bits. When the current fullness status of the bitstream buffer is 30%, the target quantity of bits is 120 bits. The fullness status of the bitstream buffer is indicated by a percentage. The percentage is a ratio of a used capacity to a total capacity of the bitstream buffer.

The correspondence among the quantity of output bits, the fullness status of the bitstream buffer, and the target quantity of bits is merely an example for description. There may be another correspondence in a specific implementation. This is not limited in this embodiment of this application.

If an estimated quantity of encoded bits output after encoding is less than the target quantity of bits of the to-be-encoded block, the first encoding QP may be decreased to increase the bit rate of the to-be-encoded block, improving image compression quality. If an estimated quantity of encoded bits output after encoding is greater than the target quantity of bits of the to-be-encoded block, and the bitstream buffer is full, the bitstream buffer may overflow. In this case, the first encoding QP may be increased to reduce the bit rate, ensuring that the bitstream buffer does not overflow.

Possibly, the encoding result information includes an encoding distortion magnitude of the to-be-encoded block in the first encoding QP. If encoding distortion is less than a first threshold, the first encoding QP may be increased. If the coding distortion is greater than a second threshold, the first encoding QP may be decreased.

Specifically, for spatial-domain encoding, the encoding distortion magnitude may be a difference between residual information before quantization and residual information after inverse quantization. For frequency domain encoding, the encoding distortion magnitude may be a difference between residual information before transformation and residual information after inverse transformation, or may be a difference between residual information after transformation and before quantization and residual information after inverse quantization and before inverse transformation.

When the encoding distortion is less than a specified threshold, encoded image quality is good. In this case, the first encoding QP may be increased to reduce the quantity of encoded bits. When the encoding distortion is greater than the specified threshold, encoded image quality is poor. In this case, the first encoding QP needs to be decreased to improve the image quality.

Possibly, the encoding result information includes the texture complexity of the to-be-encoded block. A simpler texture of the to-be-encoded block indicates a smaller first encoding QP. A more complex texture of the to-be-encoded block indicates a larger first encoding QP.

A simpler texture of the to-be-encoded block indicates more obvious image distortion caused by quantization and more perceptible to human eyes. The first encoding QP may be decreased to increase the bit rate, so as to ensure that the image distortion is not perceived by human eyes. A more complex texture of the to-be-encoded block indicates less obvious image distortion caused by quantization and less perceptible to human eyes. The first encoding QP may be increased to reduce the bit rate.

It can be learned that, when the first encoding QP is adjusted based on the texture complexity of the to-be-encoded block, the texture complexity of the to-be-encoded block may be determined based on a prediction residual corresponding to each prediction mode in S701. Specifically, a prediction direction of a prediction mode with a smaller prediction residual may represent texture information of the to-be-encoded block to some extent. This is not limited to the prediction residual. In a specific implementation, the texture complexity of the to-be-encoded block may be alternatively determined in another mode. This is not limited in this embodiment of this application.

Possibly, the encoding result information includes the prediction residual of the to-be-encoded block. If an absolute value of the prediction residual is less than a third threshold, the first encoding QP may be decreased. If the absolute value of the prediction residual is greater than a fourth threshold, the first encoding QP may be increased.

The prediction residual may reflect the texture complexity of the to-be-encoded block. A smaller prediction residual indicates a simpler texture of the to-be-encoded block. A larger prediction residual indicates a more complex texture of the to-be-encoded block. A simpler texture of the to-be-encoded block indicates more obvious image distortion caused by quantization and more perceptible to human eyes. The first encoding QP may be decreased to reduce the distortion, to ensure that the image distortion is not perceived by human eyes. A more complex texture of the to-be-encoded block indicates less obvious image distortion caused by quantization and less perceptible to human eyes. The first encoding QP may be increased to reduce the bit rate.

Possibly, the encoding result information may include any two or more of the foregoing items. Specifically, an adjustment amount of the first encoding QP corresponding to each item may be determined, and then a final adjustment amount of the first encoding QP may be calculated based on a weight of each item, to obtain the second encoding QP.

S712: Perform real encoding on the to-be-encoded block by using the second encoding QP in the optimal prediction mode.

Specifically, if the optimal prediction mode is the optimal spatial-domain prediction mode, the to-be-encoded block is predicted by using the optimal spatial-domain mode, a prediction value and a prediction residual are output, and then quantization, entropy encoding, and the like are performed on the prediction residual.

If the optimal prediction mode is the optimal frequency domain prediction mode, the to-be-encoded block is predicted by using the optimal frequency domain mode, a prediction value and a prediction residual are output, and then transformation, quantization, entropy encoding, and the like are performed on the prediction residual.

Specifically, the prediction may be determining the prediction value and the prediction residual of the to-be-encoded block based on a prediction reference direction and a prediction value calculation method that correspond to a prediction mode.

The transformation may be frequency domain transformation on the prediction residual, to obtain a transform coefficient in a transform domain.

Quantization in the spatial-domain precoding may be quantizing the prediction residual by using the first encoding QP. Quantization in the frequency domain precoding may be quantizing the transform coefficient by using the first encoding QP.

The entropy encoding may be encoding with no information loss based on an entropy principle. A mode such as Shannon coding, Huffman coding, or arithmetic coding is usually applied to encode a quantized prediction residual (real spatial-domain encoding) or a quantized transform coefficient (real frequency domain encoding).

S713: Output an encoded bit to the bitstream buffer.

Specifically, after S707 or S712, the encoded bit may be output to the bitstream buffer. In this case, the fullness status of the bitstream buffer may change. The fullness status of the bitstream buffer may further affect S702 and S711. A relationship between the fullness status of the bitstream buffer and S702 is described in both S601 and S702. Details are not described herein again. A relationship between the fullness status of the bitstream buffer and S711 is also described in S711. Details are not described herein again.

In this embodiment of this application, when a system needs to forcibly control a bit rate, the system may predict potential encoding costs caused after the bit rate is controlled by using such two different modes as bit truncation of the spatial-domain branch and coefficient discarding of the frequency domain branch, select a mode with a lower encoding cost to control the bit rate, and finally output the encoded bit. This can allow the limited encoded bit output to carry useful information (that is, information that can be easily perceived by human eyes) as much as possible, and improve image decoding quality while ensuring that the encoding bit rate meets the limitations on system memory and the bandwidth. In this embodiment of this application, when the system does not need to forcibly control the bit rate, a plurality of prediction modes may be separately provided to a spatial-domain branch and a frequency domain branch through pre-analysis. In this case, more refined point-level prediction (that is, a reconstruction value in a current prediction block may be used as a prediction reference value for a subsequent pixel in the current prediction block) can be performed without using a prediction operation in a block (that is, a prediction operation in spatial-domain encoding), to improve image compression performance by using the more refined point-level prediction. Further, in this embodiment of this application, more refined bit rate control may be implemented by using two-level bit rate control, and the bit rate is properly used to transfer image data with better quality, to improve the image compression performance.

Figure 8:
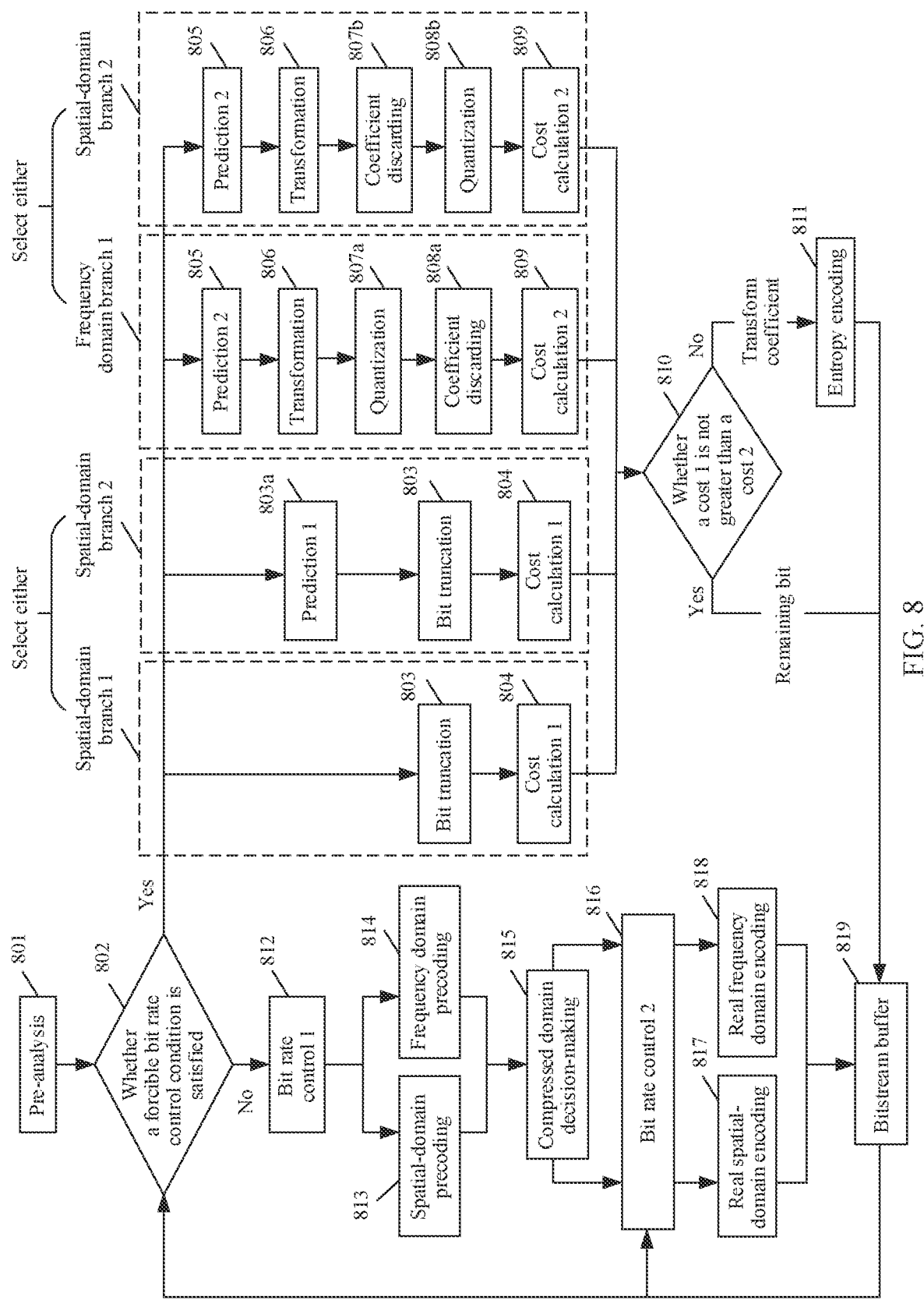
FIG. 8 is a schematic diagram of a spatial frequency domain encoding architecture to which an embodiment of this application is applicable.

The following describes two spatial frequency domain encoding architectures provided in this embodiment of this application with reference to the encoding method provided in FIG. 7a and FIG. 7b. FIG. 8 describes a spatial frequency domain encoding architecture, which may also be used to perform the coding method provided in FIG. 7a and FIG. 7b.

As shown in FIG. 8, the spatial frequency domain encoding architecture may include the following parts.

Pre-analysis 801 may select a target prediction mode from a plurality of prediction modes according to a preset cost rule. Specifically, the at least one optimal spatial-domain prediction mode may be selected from a plurality of spatial-domain prediction modes, and the at least one optimal frequency domain prediction mode may be selected from a plurality of frequency domain prediction modes. For details, refer to descriptions of S701. Details are not described herein.

A forcible bit rate control condition determination 802 is configured to determine whether the forcible bit rate control condition is currently satisfied. For details, refer to descriptions of S702. Details are not described herein. If the forcible bit rate control condition is satisfied, the bit rate is forcibly controlled by using both a spatial-domain branch and a frequency domain branch. The following separately describes two spatial-domain branches and two frequency domain branches. In a specific implementation, in the spatial frequency domain encoding architecture, one spatial-domain branch may be selected from two spatial-domain branches, and one frequency domain branch may be selected from two frequency domain branches to forcibly control the bit rate.

A spatial-domain branch 1 may include the following parts: bit truncation 803 and cost calculation 804. A spatial-domain branch 2 may include the following parts: prediction 1 803a, bit truncation 803, and cost calculation 1 804.

For the spatial-domain branch 1, the bit truncation 803 may be configured to perform bit truncation on a pixel value of ta current coding pixel in a to-be-encoded block when the forcible bit rate control condition is satisfied. For details, refer to the descriptions of S601. Details are not described herein.

The cost calculation 1 804 may be configured to calculate a first cost value corresponding to the bit truncation. For details, refer to related descriptions of S602. Details are not described herein.

For the spatial-domain branch 2,

The prediction 1 803a may be configured to predict the to-be-encoded block through at least one optimal spatial-domain prediction mode determined by using the pre-analysis 801, to obtain a prediction residual. The optimal spatial-domain prediction mode may be point-level prediction or block-level prediction.

The bit truncation 803 may be configured to perform the bit truncation on the prediction residual. For details, refer to related descriptions of S601. Details are not described herein.

The cost calculation 1 804 may be configured to calculate a first cost value corresponding to the bit truncation performed on the prediction residual. For details, refer to related descriptions of S602. Details are not described herein.

Possibly, when forcible bit rate control of the spatial-domain branch is performed, encoding costs of the spatial-domain branch 1 and the spatial-domain branch 2 may be compared, and a branch with a lower encoding cost is selected to perform the forcible bit rate control of the spatial-domain branch.

A frequency domain branch 1 may include the following parts: prediction 2 805, transformation 806, quantization 807a, coefficient discarding 808a, and cost calculation 2 809. A frequency domain branch 2 may include the following parts: prediction 2 805, transformation 806, coefficient discarding 807b, quantization 808b, and cost calculation 2 809.

For the frequency domain branch 1,

The prediction 2 805 may be configured to perform forcible bit rate control of the frequency domain branch if the forcible bit rate control condition is satisfied. Specifically, the block-level prediction may be performed on the to-be-encoded block, to determine a prediction residual of the to-be-encoded block. A block-level prediction mode may be an optimal frequency domain prediction mode determined by the pre-analysis 801. For details, refer to descriptions of S603. Details are not described herein.

The transformation 806 may be configured to perform frequency domain transformation on the prediction residual of the to-be-encoded block to obtain N frequency domain transform coefficients of the prediction residual.

The quantization 807a may be configured to quantize the N frequency domain transform coefficients of the prediction residual.

The coefficient discarding 808a may be configured to set M frequency domain transform coefficients in the N quantized frequency domain transform coefficients to zero to obtain N zeroed frequency domain transform coefficients. N and M are both positive integers, and M is less than N.

The cost calculation 2 809 may be configured to calculate a corresponding second cost value for setting the M frequency domain transform coefficients to zero.

A quantity M of the zeroed transform coefficients may be determined based on the fullness status of the bitstream buffer. Currently, a more full current bitstream buffer indicates that a bit rate needs to be reduced in a current system more urgently. In this case, the quantity M of the zeroed transform coefficients increases. Because human eyes are insensitive to high-frequency signals, zeroed coefficients may be transform coefficients corresponding to high-frequency components. This can ensure that an image loss is not perceived by human eyes after the coefficients are discarded.

For the frequency domain branch 2, the prediction 2 805 may be configured to perform forcible bit rate control of the frequency domain branch if the forcible bit rate control condition is satisfied. Specifically, the block-level prediction may be performed on the to-be-encoded block, to determine a prediction residual of the to-be-encoded block. A block-level prediction mode may be an optimal frequency domain prediction mode determined by the pre-analysis 801. For details, refer to descriptions of S603. Details are not described herein.

The transformation 806 may be configured to perform frequency domain transformation on the prediction residual of the to-be-encoded block to obtain N frequency domain transform coefficients of the prediction residual.

The coefficient discarding 807b may be configured to set M frequency domain transform coefficients in the N frequency domain transform coefficients of the prediction residual to zero, to obtain N zeroed frequency domain transform coefficients. N and M are both positive integers, and M is less than N.

The quantization 808b may be configured to quantize the N zeroed frequency domain transform coefficients.

The cost calculation 2 809 may be configured to calculate an encoding cost value obtained after the N zeroed frequency domain transform coefficients are quantized, that is, a second encoding cost value. In this embodiment of this application, transform coefficients are quantized after being set to zero, so that transform coefficients that need to be quantized can be reduced.

Compared with the frequency domain branch 2, the frequency domain branch 1 quantizes and then discards the transform coefficients. This can retain more frequency components and help improve quality of image of specific content.

Possibly, when forcible bit rate control of the frequency domain branch is performed, encoding costs of the frequency domain branch 1 and the frequency domain branch 2 may be compared, and a branch with a lower encoding cost is selected to perform the forcible bit rate control of the frequency domain branch.

For a cost calculation method applied to the cost calculation 1 and the cost calculation 2, refer to the related description in S602. Details are not described herein again.

The cost comparison 810 may be configured to compare the first cost value with the second cost value. If yes, a remaining bit after the bit truncation is output to the bitstream buffer. If not, entropy encoding is performed on the zeroed N frequency domain transform coefficients (the frequency domain branch 1) or the quantized N frequency domain transform coefficients (the frequency domain branch 2). For details, refer to related descriptions of S605. Details are not described herein.

The entropy encoding 811 may be configured to perform the entropy encoding on the zeroed N frequency domain transform coefficients (the frequency domain branch 1) or the quantized N frequency domain transform coefficients (the frequency domain branch 2), and output the encoded bit to the bitstream buffer 819.

The bit rate control 1 812 may be configured to determine a first encoding QP if the forcible bit rate control condition is not satisfied. For details, refer to descriptions of S708. Details are not described herein.

The spatial-domain precoding 813 may be configured to perform spatial-domain precoding on the to-be-encoded block by using the first coding QP in the at least one optimal spatial-domain prediction mode determined in the pre-analysis 801. The spatial-domain precoding may include prediction, quantization cost calculation. For details, refer to related descriptions of S709. Details are not described herein.

The frequency domain precoding 814 may be configured to perform frequency domain precoding on the to-be-encoded block by using the first coding QP in the at least one optimal frequency domain prediction mode determined in the pre-analysis 801. The frequency domain precoding may include prediction, transformation, quantization, and cost calculation. For details, refer to related descriptions of S709. Details are not described herein.

The compressed domain decision-making 815 may be configured for a prediction mode with a smallest encoding cost in at least the one optimal spatial-domain prediction mode and the at least one optimal frequency domain prediction mode. For details, refer to descriptions of S710. Details are not described herein.

The bit rate control 2 816 may be configured to adjust a first encoding QP by using encoding result information corresponding to an optimal prediction mode, to obtain a second encoding QP. For details, refer to descriptions of S711. Details are not described herein.

The real spatial-domain encoding 817 is configured to perform real spatial-domain encoding by using the second encoding QP in the optimal prediction mode after the optimal prediction mode is determined as the spatial-domain prediction mode in the compressed domain decision-making 815, and output an encoded bit obtained after the real spatial-domain encoding to the bitstream buffer 819. For details, refer to descriptions of S712. Details are not described herein.

The real frequency domain encoding 818 is configured to perform real frequency domain encoding by using the second encoding QP in the optimal prediction mode after the optimal prediction mode is determined as the frequency domain prediction mode in the compressed domain decision-making 815, and output an encoded bit obtained after the real frequency domain encoding to the bitstream buffer 819. For details, refer to descriptions of S712. Details are not described herein.

The bitstream buffer 819 may be configured to receive an encoded bit output by the real spatial-domain encoding 817 or the real frequency domain encoding 818, and may be further configured to receive the remaining bit output after the bit truncation or an encoded bit obtained after the entropy encoding is performed on the N zeroed frequency domain transform coefficients. In addition, the bitstream buffer 819 may also be applied to 802 and 816. A relationship between the bitstream buffer 819 and 802 is described in S601 and S702. Details are not described herein again. A relationship between the bitstream buffer 819 and 802 is also described in S711. Details are not described herein again.

Possibly, it is not limited to the forcible bit rate control mode of the frequency domain branch provided by the frequency domain branch 1 or the frequency domain branch 2. In a specific implementation, the forcible bit rate control of the frequency domain branch may also be implemented by using the following mode:

After the block-level prediction on the to-be-encoded block, the frequency domain transformation can be performed on the prediction residual to obtain N frequency domain transform coefficients of the prediction residual. Then M frequency domain transform coefficients of the N frequency domain transform coefficients are set to zero, and transform coefficients are not quantized. The second cost value is a corresponding encoding cost value for setting the M frequency domain transform coefficients to zero. The setting the M frequency domain transform coefficients to zero may be implemented through quantization. In this embodiment of this application, transform coefficients need only to be set to zero, but does not need to be additionally quantized. This simplifies a calculation method and an encoding architecture.

Figure 9:
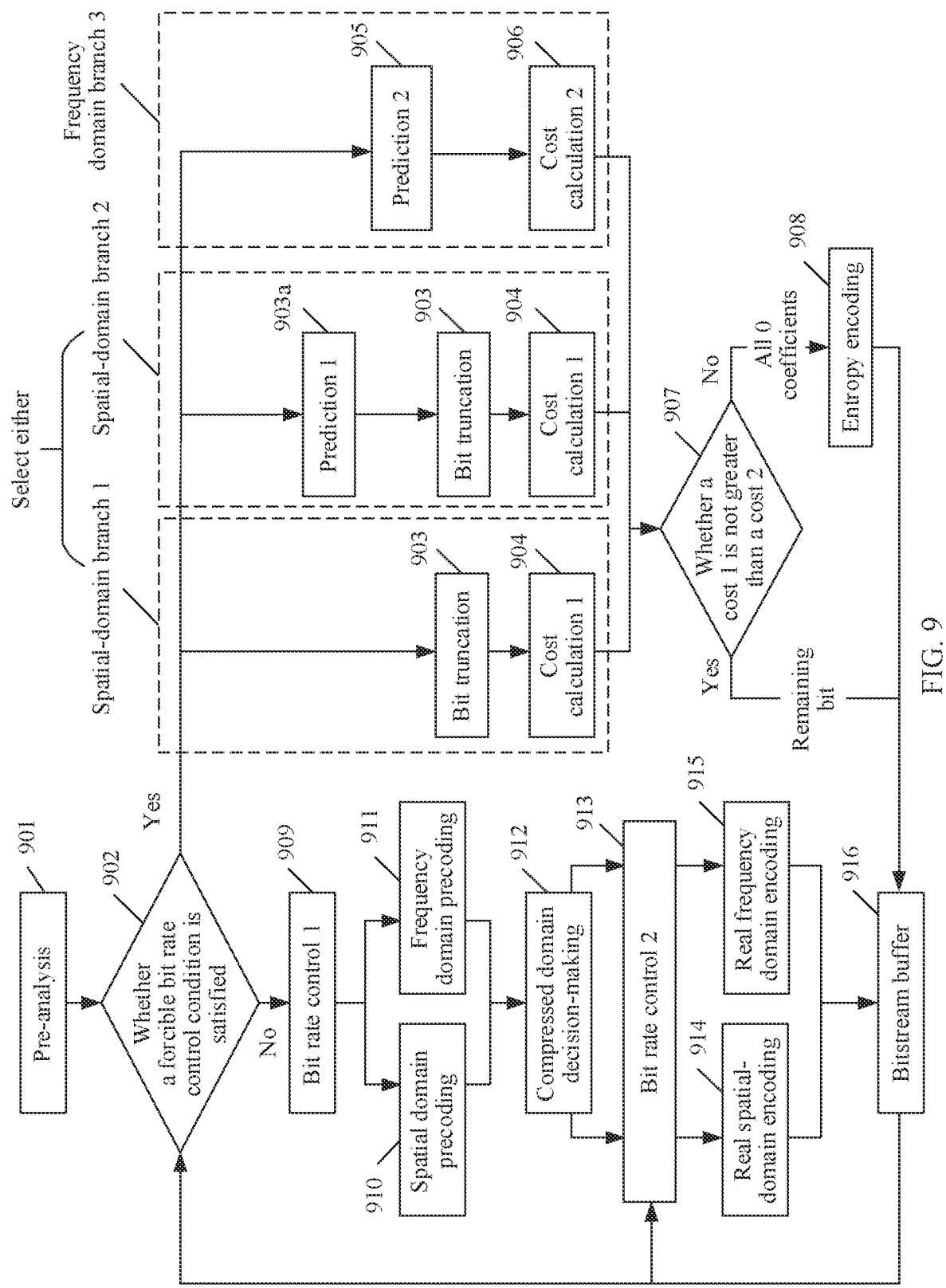
FIG. 9 is a schematic diagram of another spatial frequency domain encoding architecture to which an embodiment of this application is applicable.

FIG. 9 provides another spatial frequency domain encoding architecture. As shown in FIG. 9, the spatial frequency domain encoding architecture is the same as the spatial frequency domain encoding architecture provided in FIG. 8 except that the forcible bit rate control frequency domain branch (frequency domain branch 3) is different. The following describes only the difference. For the same parts, refer to descriptions in FIG. 8. Details are not described herein again.

The frequency domain branch 3 may include the following parts: prediction 2 905, and cost calculation 2 906.

The prediction 2 905 may be configured to perform block-level prediction on a to-be-encoded block, and output a prediction residual.

The cost calculation 2 906 may be configured to calculate a second cost value corresponding to the prediction residual after the block-level prediction.

In other words, in the spatial frequency domain encoding architecture shown in FIG. 9, all transform coefficients (that is, all 0 coefficients) are discarded in forcible bit rate control of a frequency domain branch. Subsequently, entropy encoding may be directly performed on quantized prediction residuals (all 0 coefficients), and an encoded bit is output to the bitstream buffer 917. This can simplify an encoding architecture, reduce a calculation workload, and improve encoding efficiency.

For a cost calculation method applied to the cost calculation 2 in this encoding architecture, refer to the description in S602. Details are not described herein again.

The encoding method provided in this embodiment of this application is not limited to a spatial frequency domain encoding architecture, and may be further applicable to a spatial-domain encoding architecture. The following describes the spatial-domain encoding architecture provided in embodiments of this application with reference to FIG. 10.

Figure 10:
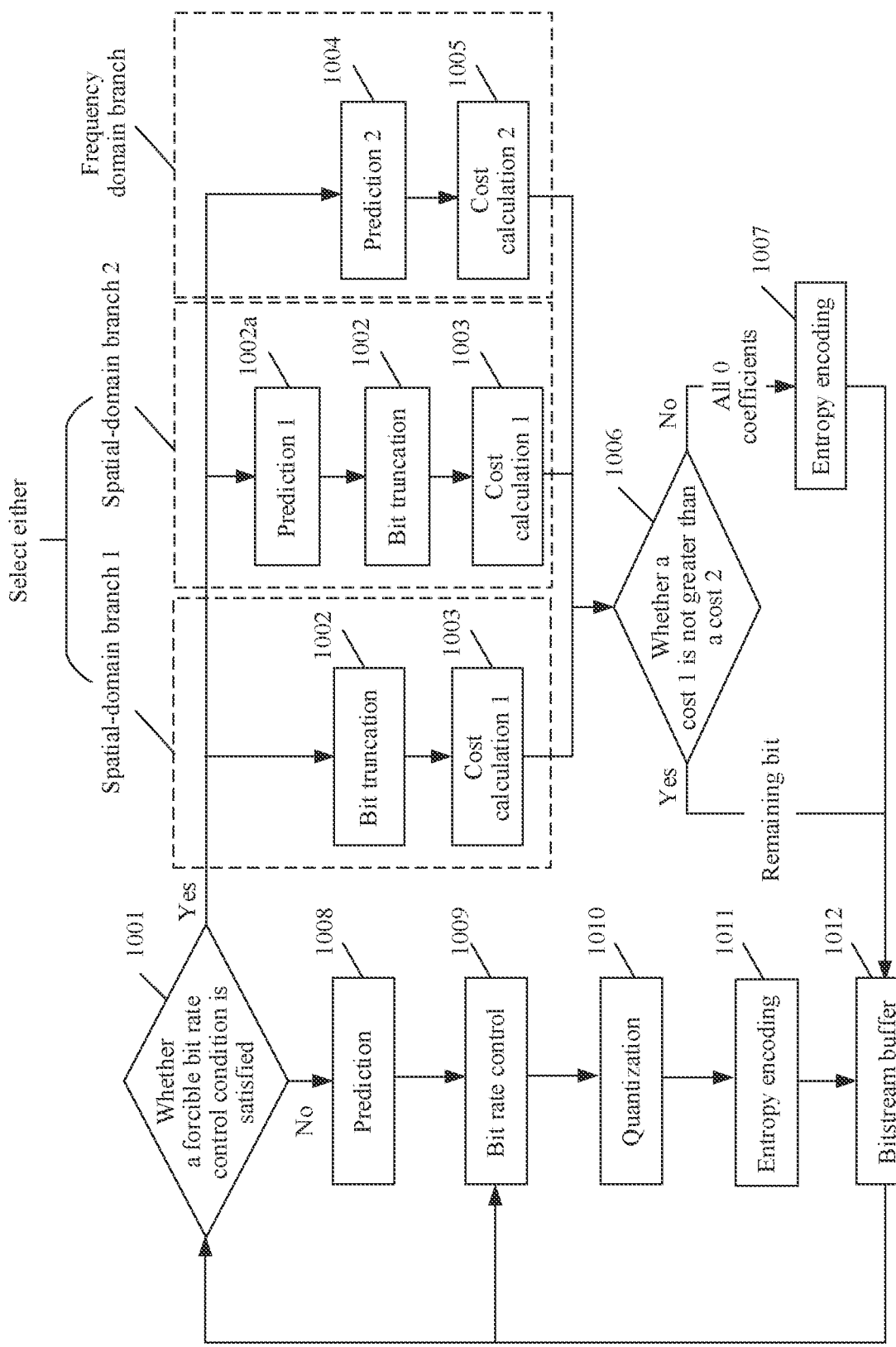
FIG. 10 is a schematic diagram of a spatial-domain encoding architecture to which an embodiment of this application is applicable.

As shown in FIG. 10, the spatial-domain encoding architecture may include the following parts.

A forcible bit rate control condition determination 1001 is configured to determine whether a forcible bit rate control condition is currently satisfied. For details, refer to descriptions of S702. Details are not described herein. If the forcible bit rate control condition is satisfied, a bit rate is forcibly controlled by using both a spatial-domain branch and a frequency domain branch. The following describes two spatial-domain branches and one frequency domain branch. In a specific implementation, in the spatial-domain encoding architecture, one spatial-domain branch may be selected from two spatial-domain branches to forcibly control the bit rate.

A spatial-domain branch 1 may include the following parts: bit truncation 1002 and cost calculation 1 1003. A spatial-domain branch 2 may include the following parts: prediction 1 1002*a*, bit truncation 1002, and cost calculation 1 1003.

The spatial-domain branch 1 is similar to the spatial-domain branch 1 in FIG. 8, and the spatial-domain branch 2 is similar to the spatial-domain branch 2 in FIG. 8. Details are not described herein again.

Possibly, when forcible bit rate control of the spatial-domain branch is performed, encoding costs of the spatial-domain branch 1 and the spatial-domain branch 2 may be compared, and a branch with a lower encoding cost is selected to perform the forcible bit rate control of the spatial-domain branch.

The frequency domain branch may include the following parts: prediction 2 1004, and cost calculation 2 1005. The frequency domain branch is similar to the frequency domain branch 3 in FIG. 9. Details are not described herein again.

The cost comparison 1006 is consistent with the cost comparison 810, and details are not described herein again.

The entropy encoding 1007 may be configured to perform entropy encoding on prediction residuals (all 0 coefficients), and output an encoded bit to a bitstream buffer 1012.

The prediction 1008 may be configured to perform point-level prediction or block-level prediction on a to-be-encoded block to obtain a prediction residual if the forcible bit rate control condition is not satisfied.

The bit rate control 1009 may be configured to determine an encoding QP based on texture complexity of the to-be-encoded block and/or the fullness status of the bitstream buffer. For details, refer to related descriptions of S708. Details are not described herein.

The quantization 1010 may be configured to quantize, by using the encoding QP determined by the bit rate control 1009, the prediction residual output by the prediction 1008.

The entropy encoding 1011 may be configured to perform entropy encoding on the prediction residual output by the quantization 1010, and output an encoded bit to the bitstream buffer 1012.

The bitstream buffer 1012 may further affect 1001 and the bit rate control 1009. A relationship between the bitstream buffer 1012 and 1001 is also described in S601 and S702. Details are not described herein again. For a relationship between the bitstream buffer 1012 and the bit rate control 1009, refer to related descriptions of the relationship between the fullness status of the bitstream buffer and the first encoding QP in S708. Details are not described herein again.

Figure 11:
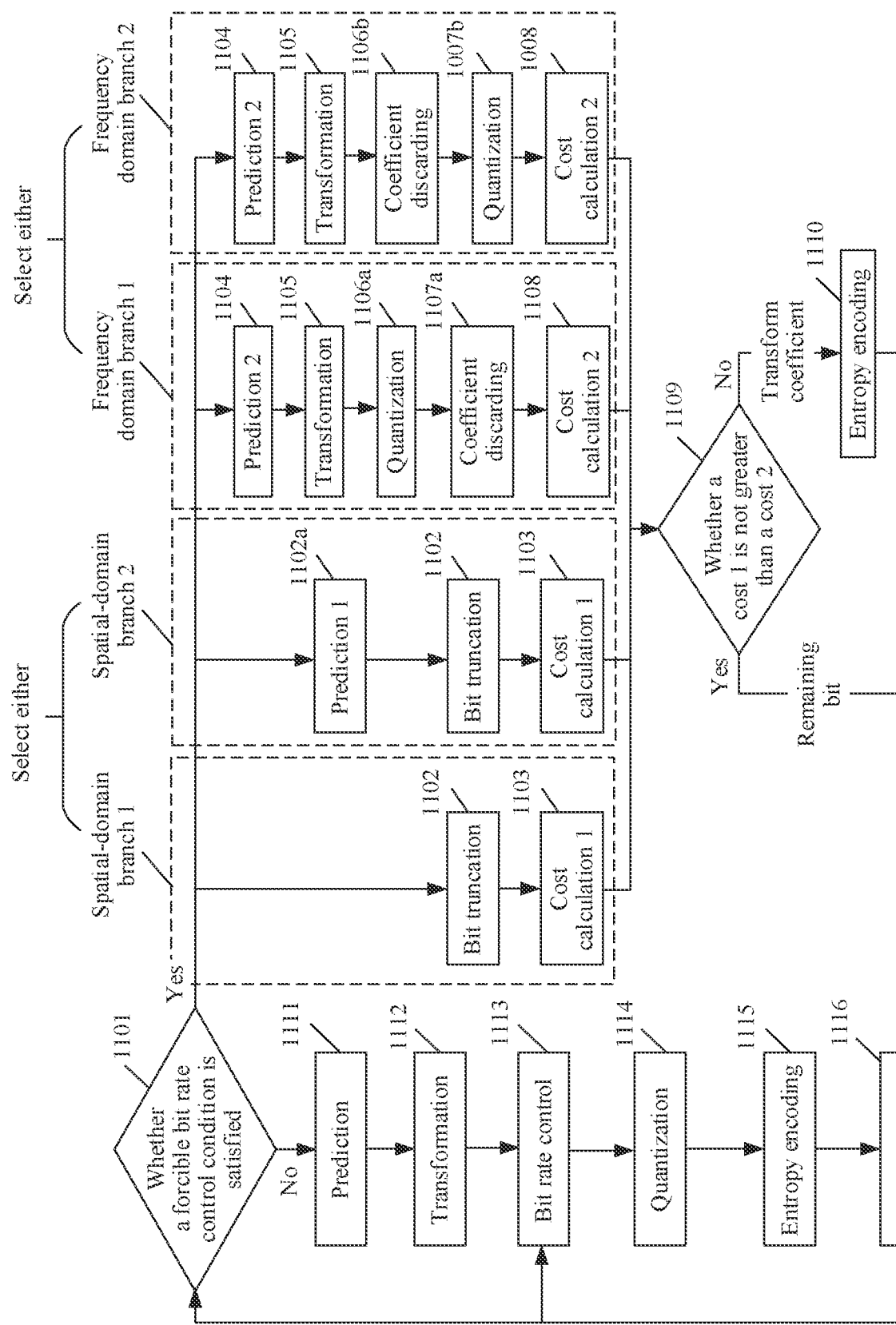
FIG. 11 is a schematic diagram of a frequency domain encoding architecture to which this application is applicable.
Figure 12:
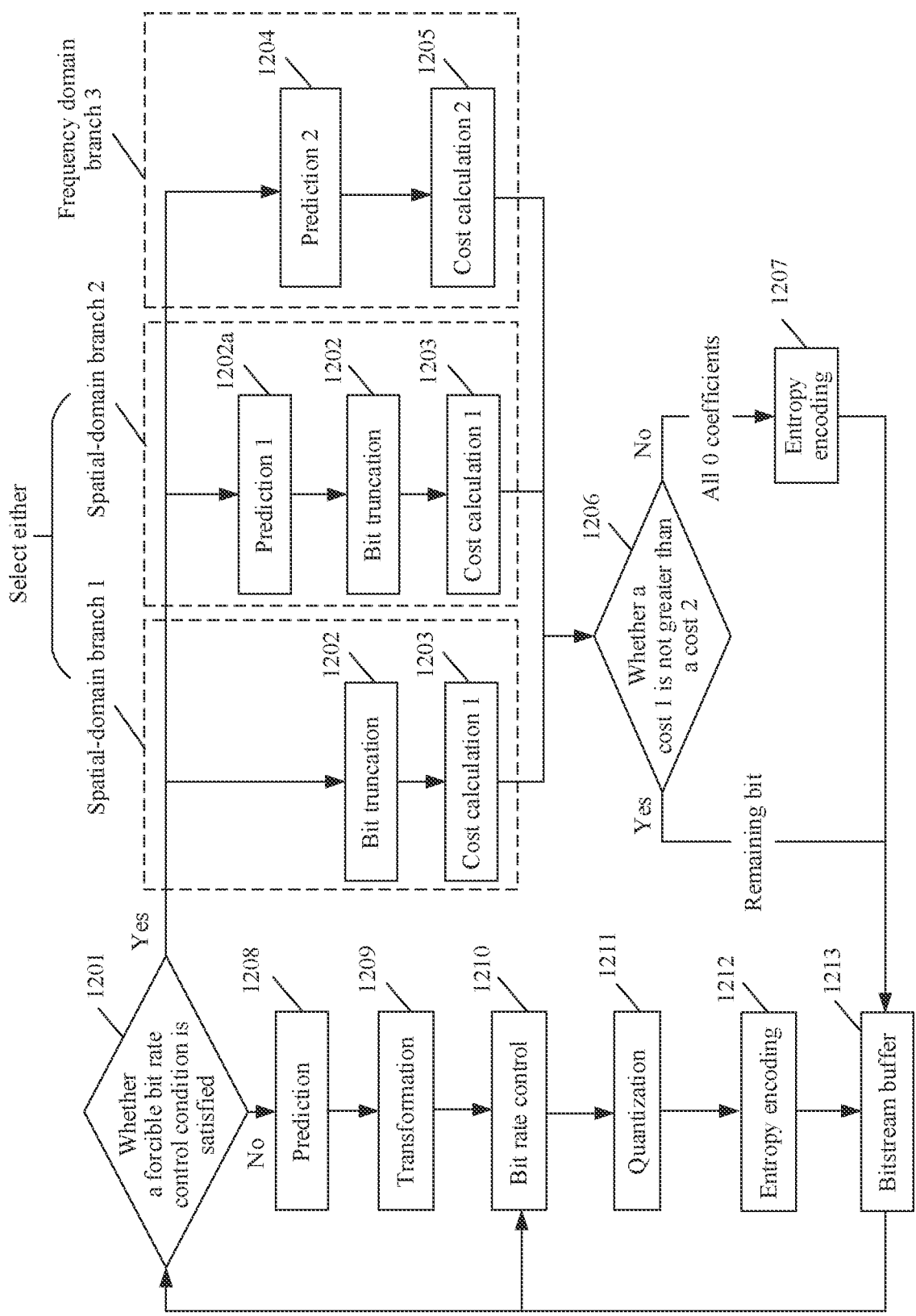
FIG. 12 is a schematic diagram of another frequency domain encoding architecture to which this application is applicable.

The encoding method provided in this embodiment of this application is not limited to the spatial frequency domain encoding architecture and the spatial-domain encoding architecture, and may be further applicable to a frequency domain encoding architecture. FIG. 11 and FIG. 12 provide several frequency domain encoding architectures.

As shown in FIG. 11, the frequency domain encoding architecture may include the following parts.

The forcible bit rate control condition determination 1101 is consistent with the forcible bit rate control condition determination 802. If the forcible bit rate control condition is satisfied, a bit rate is forcibly controlled by using both a spatial-domain branch and a frequency domain branch. The following separately describes two spatial-domain branches and two frequency domain branches. In a specific implementation, in the spatial frequency domain encoding architecture, one spatial-domain branch may be selected from two spatial-domain branches, and one frequency domain branch may be selected from two frequency domain branches to forcibly control the bit rate.

A spatial-domain branch 1 may include the following parts: bit truncation 1102 and cost calculation 1 1103. A spatial-domain branch 2 may include the following parts: prediction 1 1102a, bit truncation 1102, and cost calculation 1 1103.

The spatial-domain branch 1 is similar to the spatial-domain branch 1 in FIG. 8, and the spatial-domain branch 2 is similar to the spatial-domain branch 2 in FIG. 8. Details are not described herein again.

Possibly, when forcible bit rate control of the spatial-domain branch is performed, encoding costs of the spatial-domain branch 1 and the spatial-domain branch 2 may be compared, and a branch with a lower encoding cost is selected to perform the forcible bit rate control of the spatial-domain branch.

A frequency domain branch 1 may include the following parts: prediction 2 1104, transformation 1105, quantization 1106a, coefficient discarding 1107a, and cost calculation 2 1108. A frequency domain branch 2 may include the following parts: prediction 2 1104, transformation 1105, coefficient discarding 1106b, quantization 1007b, and cost calculation 2 1108.

The frequency domain branch 1 is similar to the frequency domain branch 1 in FIG. 8, and the frequency domain branch 2 is similar to the spatial-domain branch 2 in FIG. 8. Details are not described herein again.

Possibly, when forcible bit rate control of the frequency domain branch is performed, encoding costs of the frequency domain branch 1 and the frequency domain branch 2 may be compared, and a branch with a lower encoding cost is selected to perform the forcible bit rate control of the frequency domain branch.

The cost calculation 2 1108 is consistent with the cost calculation 2 809, and details are not described herein again.

The cost comparison 1109 is consistent with the cost comparison 810, and details are not described herein again.

The entropy encoding 1110 is consistent with the entropy encoding 811, and details are not described herein again.

The prediction 1111 may be configured to perform block-level prediction on a to-be-encoded block to obtain a prediction residual if the forcible bit rate control condition is not satisfied.

The transformation 1112 may be configured to perform frequency domain transformation on the prediction residual of the to-be-encoded block to output a transformed prediction residual.

The bit rate control 1113 is consistent with the bit rate control 1009, and details are not described herein again.

The quantization 1114 may be configured to quantize, by using the encoding QP determined by the bit rate control 1113, the transformed prediction residual output by the transformation 1112.

The entropy encoding 1115 is consistent with the entropy encoding 1011, and details are not described herein again.

The bitstream buffer 1116 is consistent with the bitstream buffer 1012, and details are not described herein again.

Possibly, it is not limited to the forcible bit rate control mode of the frequency domain branch provided by the frequency domain branch 1 or the frequency domain branch 2. In a specific implementation, the forcible bit rate control of the frequency domain branch may also be implemented by using the following mode:

After the block-level prediction on the to-be-encoded block, the frequency domain transformation can be performed on the prediction residual to obtain N frequency domain transform coefficients of the prediction residual. Then M frequency domain transform coefficients of the N frequency domain transform coefficients are set to zero, and transform coefficients are not quantized. The second cost value is a corresponding encoding cost value for setting the M frequency domain transform coefficients to zero. The setting the M frequency domain transform coefficients to zero may be implemented through quantization. In this embodiment of this application, transform coefficients need only to be set to zero, but does not need to be additionally quantized. This simplifies a calculation method and an encoding architecture.

FIG. 12 provides another frequency domain encoding architecture. As shown in FIG. 12, the frequency domain encoding architecture is the same as the frequency domain encoding architecture provided in FIG. 11 except that the forcible bit rate control frequency domain branch (frequency domain branch 3) is different. The following describes only the difference. For the same parts, refer to descriptions in FIG. 11. Details are not described herein again.

The frequency domain branch 3 may include the following parts: prediction 2 1204, and cost calculation 2 1205. The frequency domain branch 3 is similar to the frequency domain branch 3 in FIG. 9. Details are not described herein again.

In other words, in the frequency domain encoding architecture shown in FIG. 12, all transform coefficients (that is, all 0 coefficients) are discarded in forcible bit rate control of a frequency domain branch. Subsequently, entropy encoding may be directly performed on quantized prediction residuals (all 0 coefficients), and an encoded bit is output to the bitstream buffer 1213. This can simplify an encoding architecture, reduce a calculation workload, and improve encoding efficiency.

Figure 13:
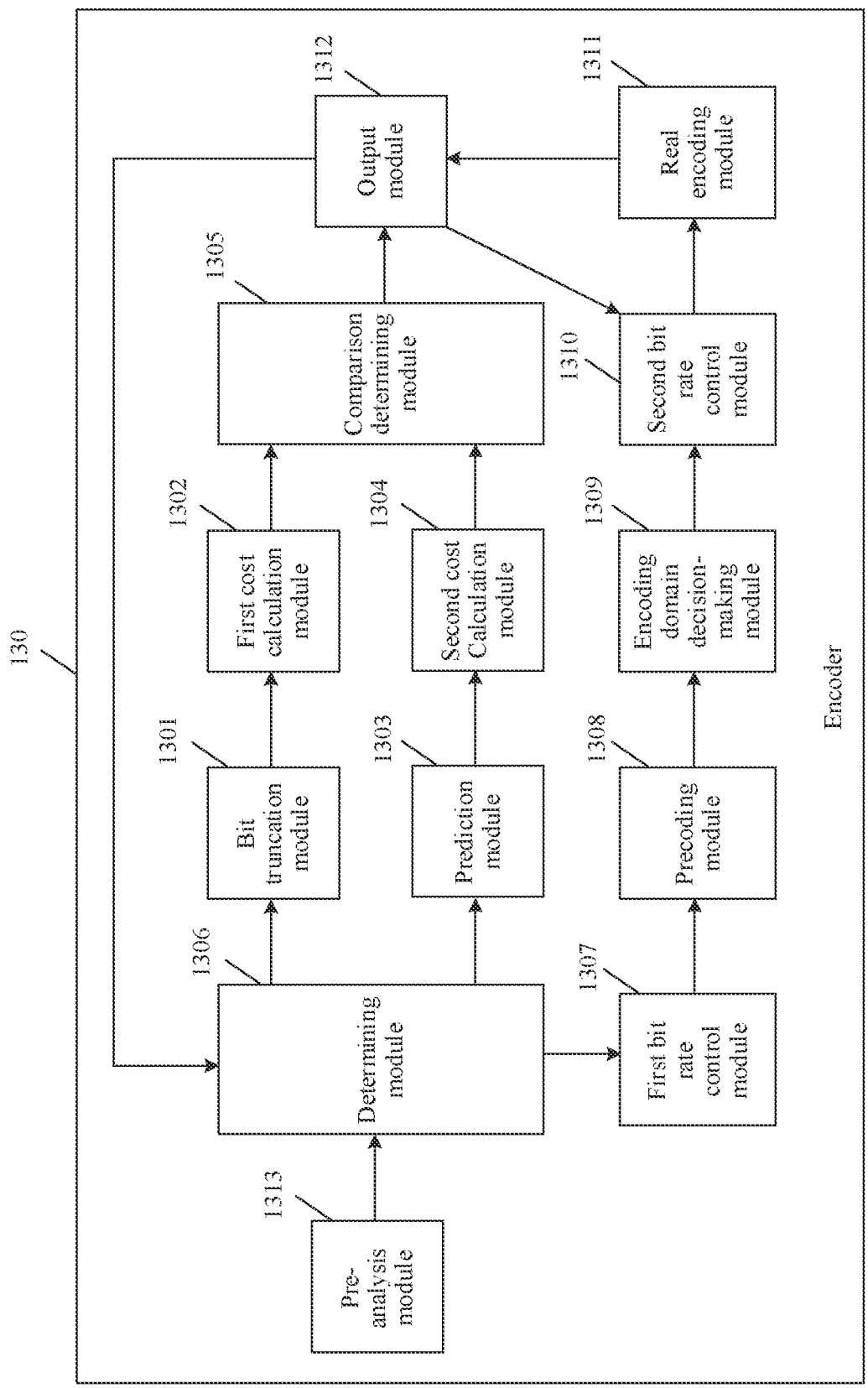
FIG. 13 is a schematic diagram of a structure of an encoder according to an embodiment of this application.

An embodiment of this application further provides an encoder. As shown in FIG. 13, the encoder 130 may include at least a bit truncation module 1301, a first cost calculation module 1302, a prediction module 1303, a second cost calculation module 1304, and a comparison determining module 1305.

A bit truncation module 1301 may be configured to perform bit truncation on a to-be-encoded block when a forcible bit rate control condition is satisfied. For details, refer to descriptions of S601. Details are not described herein.

The first cost calculation module 1302 may be configured to calculate a first cost value corresponding to the bit truncation. For details, refer to descriptions of S602. Details are not described herein.

The prediction module 1303 may be configured to perform block-level prediction on a to-be-encoded block to determine a prediction residual of the to-be-encoded block when the forcible bit rate control condition is satisfied. For details, refer to descriptions of S603. Details are not described herein.

The second cost calculation module 1304 may be configured to calculate a second cost value corresponding to the prediction based on the prediction residual; and For details, refer to descriptions of S604. Details are not described herein.

The comparison determining module 1305 may be configured to compare the first cost value with the second cost value to determine an encoded bit. For details, refer to descriptions of S605. Details are not described herein.

In a possible embodiment, the encoder 130 may further include a determining module 1306, a first bit rate control module 1307, a precoding module 1308, an encoding domain decision-making module 1309, a second bit rate control module 1310, and a real encoding module 1311.

The determining module 1306 may be configured to determine whether the forcible bit rate control condition is satisfied. For details, refer to descriptions of S702. Details are not described herein.

The first bit rate control module 1307 may be configured to determine a first encoding quantization parameter QP when the forcible bit rate control condition is not satisfied. For details, refer to descriptions of S708. Details are not described herein.

The precoding module 1308 may be configured to separately precode the to-be-encoded block by using the first encoding QP in a plurality of prediction modes, to obtain precoding result information corresponding to each prediction mode. For details, refer to descriptions of S709. Details are not described herein.

The encoding domain decision-making module 1309 may be configured to select an optimal prediction mode from the plurality of prediction modes. For details, refer to descriptions of S710. Details are not described herein.

The second bit rate control module 1310 may be configured to adjust a first encoding QP by using encoding result information corresponding to an optimal prediction mode, to obtain a second encoding QP. For details, refer to descriptions of S711. Details are not described herein.

The real encoding module 1311 may be configured to perform real encoding on the to-be-encoded block by using the second encoding QP in the optimal prediction mode. For details, refer to descriptions of S712. Details are not described herein.

In a possible embodiment, the encoder 130 further includes an output module 1312, which may be configured to output an encoded bit to the bitstream buffer. For details, refer to descriptions of S713. Details are not described herein.

The determining module 1306 may be specifically configured to: determine whether the forcible bit rate control condition is satisfied based on a fullness status of the bitstream buffer. For details, refer to descriptions of S702. Details are not described herein.

The second bit rate control module 1310 may be specifically configured to: adjust the first encoding QP based on the fullness status of the bitstream buffer and the encoding result information corresponding to the optimal prediction mode. For details, refer to descriptions of S711. Details are not described herein.

In a possible embodiment, the comparison determining module 1305 may be specifically configured to: if the first cost value is less than the second cost value, determine that the encoded bit is an encoded bit obtained after the bit truncation.

In a possible embodiment, the comparison determining module 1305 may be specifically configured to: if the first cost value is greater than the second cost value, determine that the encoded bit is an encoded bit obtained after entropy encoding is performed on the prediction residual.

In a possible embodiment, the second cost calculation module 1304 may include a transform unit, an unsetting unit, and a cost calculation unit.

The transform unit may be configured to perform frequency domain transformation on the prediction residual to obtain N frequency domain transform coefficients of the prediction residual, where N is a positive integer.

The unsetting unit may be configured to set M frequency domain transform coefficients in the N frequency domain transform coefficients to zero to obtain N zeroed frequency domain transform coefficients, where M is a positive integer less than N.

The cost calculation unit may be configured to calculate a corresponding second cost value for setting the M frequency domain transform coefficients to zero.

The comparison determining module 1305 may be specifically configured to: if the first cost value is greater than the second cost value, determine that the encoded bit is an encoded bit obtained after entropy encoding is performed on the N zeroed frequency domain transform coefficients.

In a possible embodiment, the second cost calculation module 1304 may further include: a quantization unit, configured to quantize the N frequency domain transform coefficients to obtain N frequency domain transform coefficients, after the transform unit performs frequency domain transformation on the prediction residual to obtain N frequency domain transform coefficients of the prediction residual, and before the unsetting unit sets M frequency domain transform coefficients in the N frequency domain transform coefficients to zero.

The unsetting unit may be specifically configured to: set M frequency domain transform coefficients in the N quantized frequency domain transform coefficients to zero.

In a possible embodiment, the second cost calculation module 1304 may further include: a quantization unit, configured to quantize the N zeroed frequency domain transform coefficients, after the unsetting unit sets M frequency domain transform coefficients in the N frequency domain transform coefficients to zero, and before the cost calculation unit calculates a corresponding second cost value for setting the M frequency domain transform coefficients to zero.

The cost calculation unit may be specifically configured to: calculate a second cost value for quantizing the N zeroed frequency domain transform coefficients.

In a possible embodiment, the encoder further includes: a pre-analysis module 1313, which may be configured to select a target prediction mode from a plurality of prediction modes according to a preset cost calculation rule. The target prediction mode is a prediction mode with a lowest cost value in the plurality of prediction modes, and different prediction modes correspond to different prediction directions and different prediction value calculation methods.

The prediction module 1303 may be specifically configured to predict the to-be-encoded block in the target prediction mode to determine the prediction residual of the to-be-encoded block when the forcible bit rate control condition is satisfied.

An embodiment of this application further provides a computer-readable storage medium. The computer-readable storage medium stores instructions. When the instructions are run on a computer or a processor, the computer or the processor is enabled to perform one or more steps in any one of the foregoing methods. When the modules in the foregoing signal processing apparatus are implemented in the form of a software function unit and sold or used as an independent product, the unit may be stored in the computer-readable storage medium All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded or executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium, or may be transmitted by using the computer-readable storage medium. The computer instruction may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

A person of ordinary skill in the art may understand that all or some of the processes of the methods in embodiments may be implemented by a computer program instructing relevant hardware. The program may be stored in a computer-readable storage medium. When the program runs, the processes of the methods in the embodiments may be included. The storage medium may be a magnetic disk, an optical disc, a ROM, a random access memory RAM, or the like.

A sequence of the steps of the methods in the embodiments of this application may be adjusted, combined, or removed based on an actual requirement.

The modules in the apparatus in embodiments of this application may be combined, divided, and deleted based on an actual requirement.

In conclusion, the foregoing embodiments are merely intended for describing the technical solutions of this application, rather than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. An encoding method, comprising:
   performing bit truncation on a to-be-encoded block when a bit rate control condition is satisfied;
   calculating a first cost value corresponding to the bit truncation;
   predicting the to-be-encoded block to determine a prediction residual of the to-be-encoded block when the bit rate control condition is satisfied;
   calculating, based on the prediction residual, a second cost value corresponding to the prediction; and
   comparing the first cost value with the second cost value to determine an encoded bit.

2. The method according to claim 1, wherein before performing the bit truncation on the to-be-encoded block when the bit rate control condition is satisfied, the method further comprises:
   determining whether the bit rate control condition is satisfied;
   determining a first encoding quantization parameter (QP) in response to determining that the bit rate control condition is not satisfied;
   separately precoding the to-be-encoded block by using the first encoding QP in a plurality of prediction modes, to obtain precoding result information corresponding to each prediction mode;
   selecting an optimal prediction mode from the plurality of prediction modes;
   adjusting the first encoding QP by using encoding result information corresponding to the optimal prediction mode, to obtain a second encoding QP; and
   performing real encoding on the to-be-encoded block by using the second encoding QP in the optimal prediction mode.

3. The method according to claim 2, wherein:
   after comparing the first cost value with the second cost value to determine the encoded bit, the method further comprises outputting the encoded bit to a bitstream buffer;
   determining whether the bit rate control condition is satisfied comprises determining whether the bit rate control condition is satisfied based on a fullness status of the bitstream buffer; and
   adjusting the first encoding QP by using the encoding result information corresponding to the optimal prediction mode comprises adjusting the first encoding QP based on the fullness status of the bitstream buffer and the encoding result information corresponding to the optimal prediction mode.

4. The method according to claim 1, wherein comparing the first cost value with the second cost value to determine the encoded bit comprises:
   in response to determining that the first cost value is less than the second cost value, determining that the encoded bit is obtained after bit truncation.

5. The method according to claim 1, wherein comparing the first cost value with the second cost value to determine the encoded bit comprises:
in response to determining that the first cost value is greater than the second cost value, determining that the encoded bit is obtained after entropy encoding is performed on the prediction residual.

6. The method according to claim 1, wherein calculating, based on the prediction residual, the second cost value corresponding to the prediction comprises:
performing frequency domain transformation on the prediction residual to obtain N frequency domain transform coefficients of the prediction residual, wherein N is a positive integer;
setting M frequency domain transform coefficients in the N frequency domain transform coefficients to zero to obtain N zeroed frequency domain transform coefficients, wherein M is a positive integer less than N; and
calculating a corresponding second cost value for setting the M frequency domain transform coefficients to zero, and wherein
comparing the first cost value with the second cost value to determine the encoded bit comprises in response to determining that the first cost value is greater than the second cost value, determining that the encoded bit is obtained after entropy encoding is performed on the N zeroed frequency domain transform coefficients.

7. The method according to claim 6, wherein after performing the frequency domain transformation on the prediction residual to obtain the N frequency domain transform coefficients of the prediction residual, and before setting the M frequency domain transform coefficients in the N frequency domain transform coefficients to zero, the method further comprises:
quantizing the N frequency domain transform coefficients to obtain N quantized frequency domain transform coefficients, wherein
setting the M frequency domain transform coefficients in the N frequency domain transform coefficients to zero comprises setting the M frequency domain transform coefficients in the N quantized frequency domain transform coefficients to zero.

8. The method according to claim 6, wherein after setting the M frequency domain transform coefficients in the N frequency domain transform coefficients to zero, and before calculating the corresponding second cost value for setting the M frequency domain transform coefficients to zero, the method further comprises:
quantizing the N zeroed frequency domain transform coefficients, wherein
calculating the corresponding second cost value for setting the M frequency domain transform coefficients to zero comprises calculating a second cost value for quantizing the N zeroed frequency domain transform coefficients.

9. The method according to claim 1, wherein before the predicting the to-be-encoded block to determine the prediction residual of the to-be-encoded block when the bit rate control condition is satisfied, the method further comprises:
selecting a target prediction mode from a plurality of prediction modes according to a preset cost calculation rule, wherein the target prediction mode is a prediction mode with a lowest cost value in the plurality of prediction modes, and different prediction modes correspond to at least one of different prediction directions or different prediction value calculation methods, and wherein predicting the to-be-encoded block to determine the prediction residual of the to-be-encoded block when the bit rate control condition is satisfied comprises predicting the to-be-encoded block in the target prediction mode to determine the prediction residual of the to-be-encoded block when the bit rate control condition is satisfied.

10. An encoder, comprising:
at least one processor; and
one or more memories coupled to the at least one processor and storing programming instructions for execution by the at least one processor to:
perform bit truncation on a to-be-encoded block when a bit rate control condition is satisfied;
calculate a first cost value corresponding to the bit truncation;
predict the to-be-encoded block to determine a prediction residual of the to-be-encoded block when the bit rate control condition is satisfied;
calculate a second cost value corresponding to the prediction based on the prediction residual; and
compare the first cost value with the second cost value to determine an encoded bit.

11. The encoder according to claim 10, wherein the programming instructions are for execution by the at least one processor to:
determine whether the bit rate control condition is satisfied;
determine a first encoding quantization parameter (QP) in response to determining that the bit rate control condition is not satisfied;
separately precode the to-be-encoded block by using the first encoding QP in a plurality of prediction modes, to obtain precoding result information corresponding to each prediction mode;
select an optimal prediction mode from the plurality of prediction modes;
adjust the first encoding QP by using encoding result information corresponding to the optimal prediction mode, to obtain a second encoding QP; and
perform real encoding on the to-be-encoded block by using the second encoding QP in the optimal prediction mode.

12. The encoder according to claim 11, wherein the programming instructions are for execution by the at least one processor to:
output the encoded bit to a bitstream buffer, wherein
determine whether the bit rate control condition is satisfied based on a fullness status of the bitstream buffer; and
adjust the first encoding QP based on the fullness status of the bitstream buffer and the encoding result information corresponding to the optimal prediction mode.

13. The encoder according to claim 10, wherein the programming instructions are for execution by the at least one processor to:
in response to determining that the first cost value is less than the second cost value, determine that the encoded bit is obtained after the bit truncation.

14. The encoder according to claim 10, wherein the programming instructions are for execution by the at least one processor to:
in response to determining that the first cost value is greater than the second cost value, determine that the encoded bit is obtained after entropy encoding is performed on the prediction residual.

15. The encoder according to claim 10, wherein the programming instructions are for execution by the at least one processor to:
- perform frequency domain transformation on the prediction residual to obtain N frequency domain transform coefficients of the prediction residual, wherein N is a positive integer;
- set M frequency domain transform coefficients in the N frequency domain transform coefficients to zero to obtain N zeroed frequency domain transform coefficients, wherein M is a positive integer less than N; and
- calculate a corresponding second cost value for setting the M frequency domain transform coefficients to zero, wherein
- comparing the first cost value with the second cost value to determine the encoded bit comprises in response to determining that the first cost value is greater than the second cost value, determining that the encoded bit is an encoded bit obtained after entropy encoding is performed on the N zeroed frequency domain transform coefficients.

16. The encoder according to claim 15, wherein after performing the frequency domain transformation on the prediction residual to obtain the N frequency domain transform coefficients of the prediction residual, and before setting the M frequency domain transform coefficients in the N frequency domain transform coefficients to zero, the programming instructions are for execution by the at least one processor to:
- quantize the N frequency domain transform coefficients to obtain N quantized frequency domain transform coefficients, wherein
- setting the M frequency domain transform coefficients in the N frequency domain transform coefficients to zero comprises setting the M frequency domain transform coefficients in the N quantized frequency domain transform coefficients to zero.

17. The encoder according to claim 15, wherein after setting the M frequency domain transform coefficients in the N frequency domain transform coefficients to zero, and before calculating the corresponding second cost value for setting the M frequency domain transform coefficients to zero, the programming instructions are for execution by the at least one processor to:
- quantize the N zeroed frequency domain transform coefficients, wherein
- calculating the corresponding second cost value for setting the M frequency domain transform coefficients to zero comprises calculating a second cost value for quantizing the N zeroed frequency domain transform coefficients.

18. The encoder according to claim 10, wherein before the predicting the to-be-encoded block to determine the prediction residual of the to-be-encoded block when the bit rate control condition is satisfied, the programming instructions are for execution by the at least one processor to:
- select a target prediction mode from a plurality of prediction modes according to a preset cost calculation rule, wherein the target prediction mode is a prediction mode with a lowest cost value in the plurality of prediction modes, and different prediction modes correspond to at least one of different prediction directions or different prediction value calculation methods, and wherein
- predicting the to-be-encoded block to determine the prediction residual of the to-be-encoded block when the bit rate control condition is satisfied comprises predicting the to-be-encoded block in the target prediction mode to determine the prediction residual of the to-be-encoded block when the bit rate control condition is satisfied.

19. A non-transitory computer-readable storage medium storing programming instructions for execution by at least one processor, that when executed by the at least one processor, cause a computer to perform operations comprising:
- performing bit truncation on a to-be-encoded block when a bit rate control condition is satisfied;
- calculating a first cost value corresponding to the bit truncation;
- predicting the to-be-encoded block to determine a prediction residual of the to-be-encoded block when the bit rate control condition is satisfied;
- calculating, based on the prediction residual, a second cost value corresponding to the prediction; and
- comparing the first cost value with the second cost value to determine an encoded bit.

20. The non-transitory computer-readable storage medium according to claim 19, wherein before performing the bit truncation on the to-be-encoded block when the bit rate control condition is satisfied, the operations further comprise:
- determining whether the bit rate control condition is satisfied;
- determining a first encoding quantization parameter (QP) in response to determining that the bit rate control condition is not satisfied;
- separately precoding the to-be-encoded block by using the first encoding QP in a plurality of prediction modes, to obtain precoding result information corresponding to each prediction mode;
- selecting an optimal prediction mode from the plurality of prediction modes;
- adjusting the first encoding QP by using encoding result information corresponding to the optimal prediction mode, to obtain a second encoding QP; and
- performing real encoding on the to-be-encoded block by using the second encoding QP in the optimal prediction mode.

* * * * *